(12) United States Patent
Amir et al.

(10) Patent No.: US 8,984,297 B2
(45) Date of Patent: Mar. 17, 2015

(54) AUTHENTICATED ADVERSARIAL ROUTING

(75) Inventors: Yair Amir, Bethesda, MD (US); Paul Bunn, Los Angeles, CA (US); Rafail Ostrovsky, Los Angeles, CA (US)

(73) Assignees: The Regents of the University of Calfiornia, Oakland, CA (US); The Johns Hopkins University, Baltimore, MD (US)

( * ) Notice: Subject to any disclaimer, the term of this patent is extended or adjusted under 35 U.S.C. 154(b) by 783 days.

(21) Appl. No.: 12/922,141

(22) PCT Filed: Mar. 13, 2009

(86) PCT No.: PCT/US2009/037202
§ 371 (c)(1),
(2), (4) Date: Sep. 10, 2010

(87) PCT Pub. No.: WO2009/114835
PCT Pub. Date: Sep. 17, 2009

(65) Prior Publication Data
US 2011/0016316 A1    Jan. 20, 2011

Related U.S. Application Data

(60) Provisional application No. 61/036,386, filed on Mar. 13, 2008.

(51) Int. Cl.
*G06F 21/00*    (2013.01)
*H04L 29/06*    (2006.01)

(52) U.S. Cl.
CPC ............ *H04L 63/12* (2013.01); *H04L 63/1416* (2013.01)
USPC .......................................... 713/188; 713/187

(58) Field of Classification Search
CPC ..... H04W 12/06; H04W 12/02; H04W 12/10; H04W 40/02; H04W 40/246; H04W 84/18; H04L 45/26; H04L 63/12; H04L 63/1416; H04L 63/1441; H04L 63/14; H04L 63/1425; H04L 63/1408; H04L 63/20; G06F 21/55; G06F 21/56
See application file for complete search history.

(56) References Cited

U.S. PATENT DOCUMENTS

| | | | | |
|---|---|---|---|---|
| 5,627,766 A | * | 5/1997 | Beaven | ........................ 702/122 |
| 7,676,217 B2 | * | 3/2010 | Zhu et al. | ...................... 455/411 |
| 2004/0025018 A1 | * | 2/2004 | Haas et al. | .................... 713/168 |

(Continued)

OTHER PUBLICATIONS

Slide The Key to Polynomial End-to-End Communication Journal of Algorithms 22, 158-186 (1997).*

(Continued)

*Primary Examiner* — Michael S McNally
*Assistant Examiner* — Carlton Johnson
(74) *Attorney, Agent, or Firm* — Fenwick & West LLP

(57) ABSTRACT

A routing protocol is used to transmit messages from a sender to a receiver over a network of nodes, where adversaries can control links between the nodes and can also control the behavior of a large number of nodes. Various techniques can be used, along or in combination, to combat these effects. In one approach, certain trigger conditions are identified, the occurrence of which signals malicious behavior within the network. When signaled, the sender requests status reports from the intermediate nodes in an effort to determine which nodes are malicious. The information for the status reports is generated by nodes as packets are passed from one node to the next.

24 Claims, 6 Drawing Sheets

(56) References Cited

U.S. PATENT DOCUMENTS

| | | | |
|---|---|---|---|
| 2005/0063377 A1 | 3/2005 | Bryant et al. | |
| 2006/0075096 A1 | 4/2006 | Ueda et al. | |
| 2006/0161980 A1* | 7/2006 | Huitema et al. | 726/22 |

OTHER PUBLICATIONS

Slide The Key to Polynomial End-to-End Communication Journal of Algorithms 22, 158-186 (1997), Akers.*

Afek, Y. et al., "End-to-End Communication in Unreliable Networks," PODC, ACM, 1988, pp. 131-148.

Afek, Y. et al., "Slide—The Key to Polynomial End-to-End Communication," Journal of Algorithms, 1997, pp. 158-186, vol. 22.

Afek, Y. et al., "The Slide Mechanism With Applications In Dynamic Networks," Proc. of the 11th ACM Symp. on Principles of Distributed Computing, ACM, 1992, pp. 35-46.

Aiello, W. et al., "Adaptive Packet Routing for Bursty Adversarial Traffic," J. Comput. Syst. Sci., ACM, 2000, pp. 482-509, vol. 60, No. 3.

Awerbuch, B. et al., "An On-Demand Secure Routing Protocol Resilient to Byzantine Failures," WiSE '02, ACM, Sep. 28, 2002, pp. 21-30.

Awerbuch, B. et al., "Improved Approximation Algorithms for the Multi-Commodity Flow Problem and Local Competitive Routing in Dynamic Networks," STOC., ACM, 1994, pp. 487-496.

Awerbuch, B. et al., "Polynomial End-To-End Communication," IEEE, 1989, pp. 358-363.

Barak, B. et al., "Protocols and Lower Bounds for Failure Localization in the Internet," N. Smart (Ed.), Proc. of Advances in Cryptology—27th EUROCRYPT 2008, Springer LNCS 4965, 2008, pp. 341-360.

Even, S. et al., "On-Line/Off-Line Digital Signatures," G. Brassard (Ed.), Advances in Cryptology—CRYPTO '89, LNCS 435, Springer-Verlag, 1990, pp. 263-275.

Goldberg, S. et al., "A Cryptographic Study of Secure Fault Detection in the Internet," Princeton University, Department of Compo Sci., Technical Report. May 2007, pp. 1-27.

Goldberg, S. et al., "Path-Quality Monitoring in the Presence of Adversaries," ACM SIGMETRICS '08, ACM, Jun. 2008, pp. 193-204, vol. 36.

Kushilevitz, E. et al., "Log-Space Polynomial End-to-End Communication," SIAM Journal of Computing, Dec. 1998, pp. 1531-1549, vol. 27, No. 6.

Micali, S. et al., "Optimal Error Correction Against Computationally Bounded Noise," J. Kilian (Ed.), TCC 2005, LNCS 3378, Springer-Verlag, 2005, pp. 1-16.

PCT International Search Report and Written Opinion, PCT Application No. PCT/US2009/037202, Jun. 8, 2009, 10 pages.

Rajagopalan, S. et al., "A Coding Theorem for Distributed Computation," Proc. 26th STOC, ACM, 1994, pp. 790-799.

Shamir, A. et al., "Improved Online/Offline Signature Schemes," J. Kilian (Ed.), CRYPTO 2001, Springer-Verlag, 2001, pp. 355-367.

Shannon, C. E., "Communication in the Presence of Noise," Proc. Institute of Radio Engineers, Jan. 1949, pp. 10-21, vol. 37, No. 1.

Schulman, L., "Coding for Interactive Communication," IEEE Transactions on Information Theory, Nov. 1996, pp. 1745-1756, vol. 42, No. 6.

* cited by examiner

| Stage | Node A | | Node B |
|---|---|---|---|
| 1 | $H_A$ := Height of Stack$_{OUT}$(A,B)<br>Height of flagged p (if any)<br>Round prev. packet was sent | → | |
| | | ← | $H_B$ := Height of Stack$_{IN}$(A,B)<br>Round prev. packet was received |
| 2 | Send packet if:<br>• $H_A > H_B$   OR<br>• B didn't rec. prev. packet sent | → | |

FIG. 7

| Stage | Node A | | Node B |
|---|---|---|---|
| 1 | $H_A$ := Height of Stack$_{OUT}$(A,B)<br>Height of flagged p (if any)<br>Round prev. packet was sent<br>Confirm of rec. of broadcast info. | → | |
| | | ← | $H_B$:=Height of Stack$_{IN}$(A,B)<br>Round prev. packet was received<br>Sig's on values for edge E(A,B) |
| 2 | Send p. and Sig's on values for E(A,B) if:<br>• "Enough" bdcst info has passed E(A,B), AND<br>• B is not on A's probation or eliminated list, AND<br>• $H_A > H_B$ OR B didn't rec. prev. packet sent | → | Receive packet if:<br>• "Enough" bdcst info has passed E(A,B), AND<br>• A is not on B's probation or eliminated list |
| | | ← | Broadcast Information |

AUTHENTICATED ADVERSARIAL ROUTING

CROSS-REFERENCE TO RELATED APPLICATION(S)

This application claims priority under 35 U.S.C. §119(e) to U.S. Provisional Patent Application Ser. No. 61/036,386, "Routing Protocol Secure Against a Malicious Adversary," filed Mar. 13, 2008 by Yair Amir et al. The subject matter of the foregoing is incorporated herein by reference in its entirety.

GOVERNMENT RIGHTS LEGEND

This invention was made with Government support of Grant No. 0430254 and 0430271 awarded by the National Science Foundation. The Government has certain rights in this invention.

BACKGROUND OF THE INVENTION

1. Field of the Invention

This invention relates to data communications over a network of unknown trustworthiness.

2. Description of the Related Art

To date, routing protocols that consider adversarial networks have been of two main flavors. End-to-End Communication protocols consider dynamic topologies. Fault Detection and Localization protocols handle devious behavior of nodes.

One example addressing End-to-End Communication in distributed networks is the Slide protocol, also know as "gravitational flow" routing. It was designed to perform end-to-end communication with bounded memory in a model where an adversary controls the links between nodes in the network. There has been much work based on the Slide protocol. For example, see Y. Afek, E. Gafni "End-to-End Communication in Unreliable Networks." *PODC*, pp. 1988; Y. Afek, B. Awebuch, E. Gafni, Y. Mansour, A. Rosen, and N. Shavit. "Slide—The Key to Polynomial End-to-End Communication." *Journal of Algorithms* 22, pp. 158-186, 1997; B. Awerbuch, Y Mansour, N Shavit "End-to-End Communication With Polynomial Overhead." *Proc. of the 30th IEEE Symp. on Foundations of Computer Science, FOCS*, 1989; and E. Kushilevitz, R. Ostrovsky, and A. Rosén. "Log-Space Polynomial End-to-End Communication." *SIAM Journal of Computing* 27(6): 1531-1549, 1998. However, to our knowledge, there is no prior work based on the Slide protocol that can handle malicious behavior of nodes.

There have also been a number of works that explore the possibility of a node-controlling adversary that can corrupt nodes. In one idealized model of this scenario, the adversary can corrupt any node on the path (except the sender and receiver) in a dynamic and malicious manner. Since corrupting any node on the path will sever the honest connection between the sender and receiver, the goal of a protocol in this model is not to guarantee that all messages sent to R the receiver are received. Instead, the goal is to detect faults when they occur and to localize the fault to a single edge. See for example B. Barak, S. Goldberg, and D. Xiao. "Protocols and Lower Bounds for Failure Localization in the Internet." *Proc. of Advances in Cryptology—27th EUROCRYPT* 2008, *Springer LNCS* 4965, pp. 341-360, 2008.

One approach addressing this model uses the notion of a secured fault detection/fault localization protocol, as well as providing lower bounds in terms of a communication complexity to guarantee accurate fault detection/location in the presence of a node-controlling adversary. However, this approach does not seek to guarantee successful or efficient routing between the sender and receiver. Instead, the mathematical proof of security guarantees that if a package is deleted, malicious nodes cannot collude to convince the sender that no fault occurred, nor can they persuade the sender into believing that the fault occurred on an honest edge. Localizing the fault in this approach relies on cryptographic tools, and in particular the assumption that one-way functions exist. Although utilizing these tools increases communication cost, it has been shown that the existence of a protocol that is able to securely detect faults (in the presence of a node-controlling adversary) implies the existence of one-way functions, and it has also been shown that any protocol that is able to securely localize faults necessarily requires the intermediate nodes to have a trusted setup.

In addition to the routing protocol work described above, there has been a fair amount of work on error correction in an active setting. Due to space considerations, we will not be able to give a comprehensive account of all the work in this area. Instead we highlight some of the most relevant works. For a lengthy treatment of error-correcting codes against polynomially bounded adversaries, we refer to S. Micali, C. Peikert, M. Sudan, and D. Wilson. "Optimal Error Correction Against Computationally Bounded Noise." *TCC LNCS* 3378, pp. 1-16, 2005 and references therein. However, this work deals with a graph with a single "noisy" edge, as modeled by an adversary who can partially control and modify information that crosses the edge. In particular, it does not address throughput efficiency or memory considerations in a full communication network, nor does it account for malicious behavior at the nodes. S. Rajagopalan and L. Schulman "A Coding Theorem for Distributed Computation." *Proc. 26th STOC*, pp. 790-799, 1994 consider error-correcting network coding. However, their work does not consider actively malicious nodes.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 7 is a diagram that shows communications between nodes A and B along edge E(A, B) for an example edge-scheduling adversary protocol.

FIG. 8 is a diagram that shows communications between nodes A and B along edge E(A, B) for an example (node-controlling+edge-scheduling) adversary protocol.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
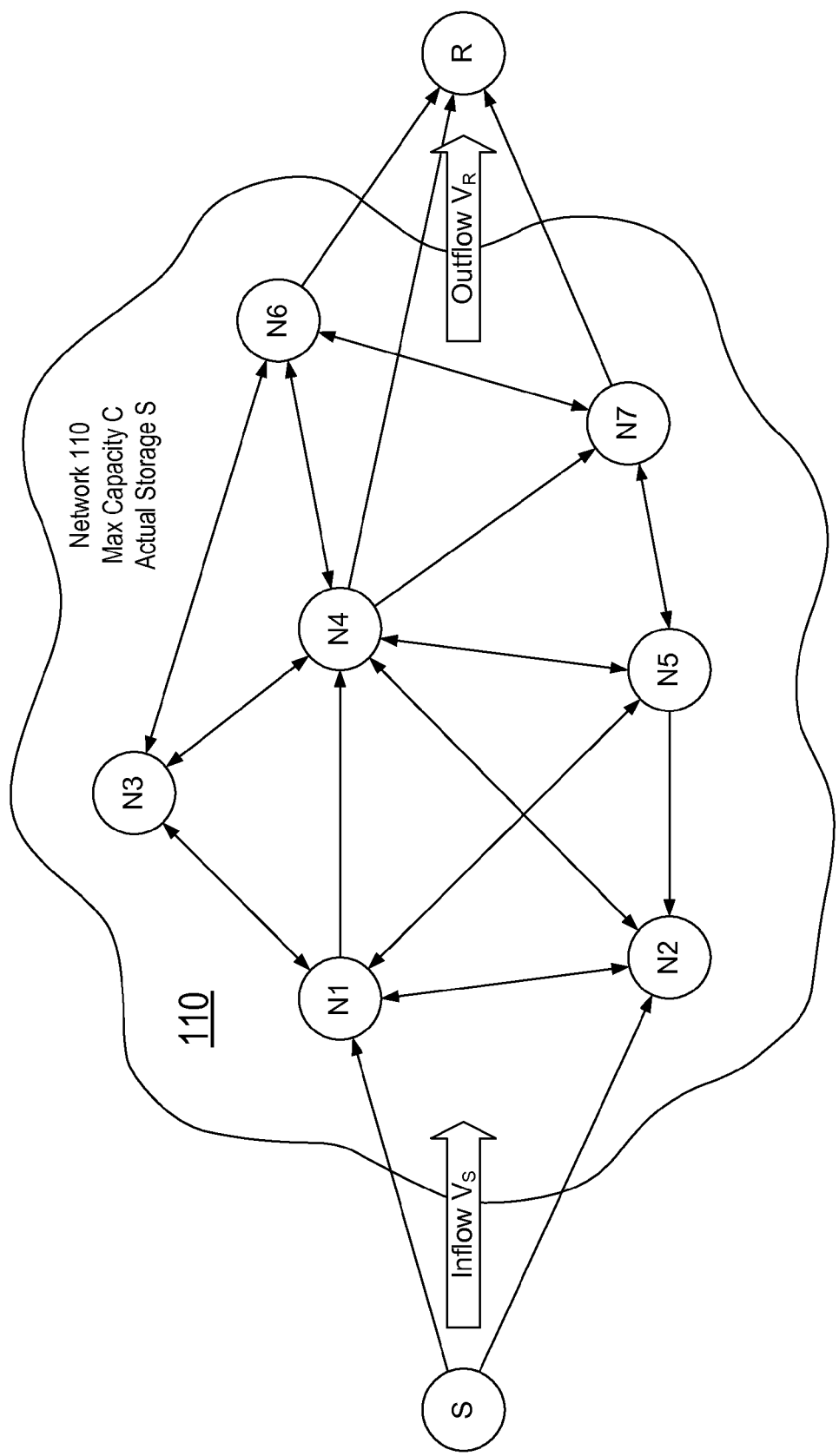
FIG. 1 is a block diagram of a network suitable for use with aspects of the invention.

Outline
I. Overview
   I.A Some Terms and Definitions
   I.B General Cases of Malicious Behavior
      I.B.1 Case A (Packet Deletion)
      I.B.2 Case B (Packet Duplication)
      I.B.3 Case C (Packet Substitution)
   I.C Combining Cases
   I.D Sender Policing and the Probation List
II. Case Introduction
   II.A Problem Statement
   II.B Adversaries
   II.C Malicious Behaviors
III. Highlights of an Example Protocol
IV. Formal Model for the Example Protocol
   IV.A The Edge-Scheduling Adversarial Model
   IV.B The Node-Controlling+Edge-Scheduling Adversarial Model
V. Example Routing Protocol in the Edge-Scheduling Adversarial Model
   V.A Definitions and High-Level Description
   V.B Detailed Description of the Edge-Scheduling Protocol
      V.B.1 Setup Phase
      V.B.2 Routing Phase
      V.B.3 Re-Shuffle Rules
   V.C Performance of the Edge-Scheduling Adversarial Protocol
VI. Example Routing Protocol in the (Node-Controlling+Edge-Scheduling) Adversarial Model
   VI.A Definitions and High-Level Description
   VI.B Detailed Description of the Node-Controlling+Edge-Scheduling Protocol
      VI.B.1 Setup Phase
      VI.B.2 Routing Phase
      VI.B.3 Re-Shuffle Rules
      VI.B.4 Update Broadcast Buffer Rules
   VI.C Performance of the Node-Controlling+Edge-Scheduling Adversarial Protocol
VII. Additional Remarks
VIII. Pseudo Code for the Example Edge-Scheduling Adversarial Protocol
   VIII.A Intermediate nodes' setup
   VIII.B Sender and Receiver's Additional Setup
   VIII.C Routing Rules
   VIII.D Routing Rules (cont.)
   VIII.E Re-Shuffle Rules
IX. Pseudo Code for the Example Node-Controlling+Edge-Scheduling Adversarial Protocol
   IX.A Intermediate nodes' setup
   IX.B Sender and Receiver's Additional Setup
   IX.C Routing Rules
   IX.D Routing Rules (cont.)
   IX.E Re-Shuffle Rules I. Overview
   I.A Some Terms and Definitions FIG. 1 is a block diagram of a network suitable for use with aspects of the invention. The network contains a number of nodes, denoted by circles in FIG. 1, which can communicate with each other via data paths, denoted by lined arrows in FIG. 1. One of the nodes, referred to as the sender S, would like to send messages to another node, referred to as receiver R, via the network 110 of remaining nodes N1 . . . Nn, referred to as intermediate nodes.

In some cases, the sender S and/or receiver R can be specialized nodes. In other cases, they may not be. For example, node N2 may be an intermediate node with respect to messages sent from node S to node R, but node N2 may function as the sender with respect to messages sent from node N2 to node N7 and may function as the receiver with respect to messages sent from node N3 to node N2. Furthermore, node N2 may simultaneously play the roles of sender, receiver and intermediate node since messages may be simultaneously traversing the network from many different senders to many different receivers.

The lines between nodes in FIG. 1 show possible data paths from one node to the next. The arrows show the directions of the data paths, which could be unidirectional or bidirectional. The links between nodes (which will be referred to as edges) may also change status between available (or "up") and unavailable (or "down"). An edge may go down for various reasons. For example, an adversary may try to disrupt communications by bringing down edges. Alternately, an edge may go down for more benign reasons, for example equipment malfunction.

Some, or even most, of the intermediate nodes Nj may also be malicious. For example, they may delete received packets, duplicate packets or exhibit other types of malicious behavior. Nodes that are not malicious are referred to as non-malicious nodes or honest nodes. A network consisting of only honest nodes is referred to as a non-malicious network or an honest network.

Sender S tries to send a certain quantum of data to receiver R during a transmission attempt. The data is transmitted through the network using a certain protocol P. The packets sent by S are processed by S so that they later can be authenticated by others. The term "authenticize" will be used to mean processing something so that it can be authenticated. Thus, the sender S authenticizes the packets that it sends out. For example, if authentication is based on a public key infrastructure, S may digitally sign the packets using S's private key so that nodes can later authenticate the packet using S's public key. In this way, packets that have been tampered with can be detected and processed accordingly (e.g., ignored) by honest nodes, although malicious intermediate nodes can drop or duplicate (i.e., replay) packets without tampering with their contents.

If network 110 is honest, then sender S will be able to reliably send messages to receiver R. Thus, in one approach, if there are signs of malicious behavior, sender S tries to isolate which node(s) are malicious, eliminate those nodes from the network (for example, by prohibiting communications to the eliminated nodes), thus leaving an honest network over which messages can be reliably sent.

Figure 2:
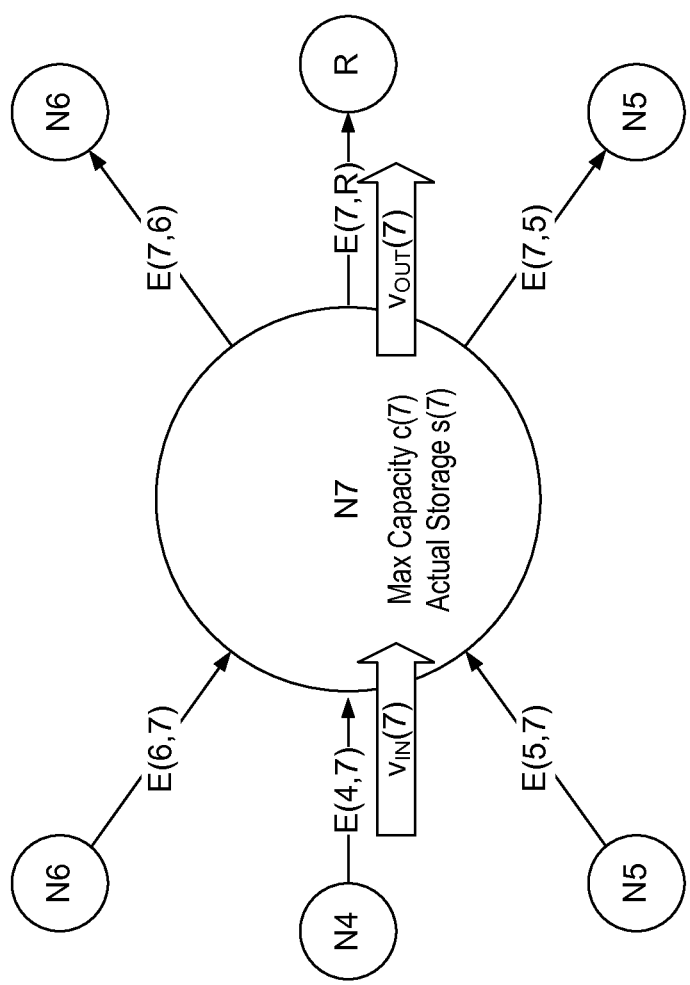
FIG. 2 is a diagram that shows the packet flow into and out of a node.

FIG. 2 shows the packet flow into and out of a node Nj (node N7 from FIG. 1 in this example). Referring to FIG. 1, node N7 can receive packets from upstream nodes N6, N4 and N5, and can send packets to downstream nodes N6, R and N5. Note that some nodes can be both upstream and downstream nodes (e.g., nodes N6 and N5 in this example). For convenience, in FIG. 2, the upstream nodes are shown to the left of N7 and the downstream nodes to the right of N7. Nodes N6 and N5 are duplicated since they can be both upstream and downstream nodes. The link from node A to node B is referred to as edge E(A, B).

Each node Nj has an individual maximum node capacity $c(j)$, assuming it is an honest node. That is, the maximum number of packets that can be stored at an honest node Nj is c(j). The actual number of packets stored at node Nj at any specific time is s(j). Referring to FIG. 1, in an analogous fashion, the network 110 has an aggregate maximum network capacity C (assuming all honest nodes), and the actual number of packets stored in the network at any particular time is S. During the transmission attempt, VS is the number of packets sent by sender S into the network, VR is the number of packets received by receiver R from the network, and S is the change in the number of packets stored within the network. Analogously, in FIG. 2, vIN(j) is the number of packets received by node Nj during a transmission attempt, vOUT(j) is the number of packets sent by node Nj, and s(j) is the change in the number of packets stored within node Nj.

If there is no malicious behavior, then $$\Delta S = V_S - V_R \text{ for the network generally, and} \quad (1A)$$

$$\delta s(j) = v_{IN}(j) - v_{OUT}(j) \text{ for each node } Nj. \quad (1B)$$

If the network is honest, then Eqns. 1A and 1B will be satisfied. However, the converse is not true. If Eqns. 1A and 1B are satisfied, this does not mean that the network is honest. For example, a malicious node may delete a certain number of packets and then replace them with previously received packets. In that case, Eqns. 1A and 1B will still be satisfied, but there is malicious behavior and sender S may not be able to send its messages to the receiver R. As another example, a malicious node may be acting honestly for a period of time, during which Eqns. 1A and 1B will be satisfied.

In addition to Eqns. 1A and 1B, protocol P may also define $$\min\{V_S\} = \text{minimum number of packets that sender S should be able to insert into an honest network during a transmission attempt; and} \quad (1C)$$

$$\min\{V_R\} = \text{minimum number of packets that receiver R should receive from an honest network during a transmission attempt} \quad (1D)$$

Protocol P may also define other expected behaviors for networks without malicious nodes.

I.B General Cases of Malicious Behavior

Based on these conditions, various signs of possible malicious behavior can be identified and treated as follows:

I.B.1 Case A (Packet Deletion)

One malicious behavior is where malicious nodes delete packets without replacing them. This will be referred to as the "packet deletion" case, although the tests below may also be triggered by other types of malicious behavior.

Test Conditions: One possible test for the packet deletion case is:

$$\text{Is } V_R < V_S - \Delta S? \quad (\text{Test A1})$$

Test A1 is accurate, but it relies on an estimate for ΔS, which may not be reliably available or which may take a long time to determine. An alternate test is:

$$\text{Is } V_R < V_S - C? \quad (\text{Test A2})$$

C is the maximum possible value for ΔS. Therefore, if Test A2 is true, then Test A1 must also be true. Other estimates for ΔS or max {ΔS} can also be used.

Yet another possible test for the packet deletion case is:

$$\text{Is } V_R < \min\{V_R\} \text{ and } V_S \geq \min\{V_S\}? \quad (\text{Test A3})$$

In this case, the packet flow on the sender side is okay since the sender is able to insert the expected minimum number of packets. However, the packet flow on the receiver side is stalled (i.e., too low). Therefore, it seems reasonable that packets are being deleted within the network somewhere.

In yet another approach, the packets may be ordered or otherwise labeled so that the receiver R can determine if certain packets are missing. For example, assume that sender S numbers packets sequentially and that 10 packets are sent by S during a transmission attempt. If receiver R receives packets #124, 125, 127, 128, 129, 131, 132, 133, then receiver R may conclude that packets #126 and 130 are missing and possibly deleted. Thus, another test may be:

Is receiver R missing any packets that it expected to receive? (Test A4)

Isolation Action: If the packet deletion case is identified, then the sender S can take remedial actions to determine which node is deleting packets. In one approach, the sender determines which node(s) are violating Eqn. (1B) above by applying the test $$\text{Is } v_{IN}(j) - v_{OUT}(j) > \delta s(j) \text{ for node } Nj? \quad (\text{Test AA1})$$

If the test is satisfied, then that node Nj likely is deleting packets. The sender applies the above "isolation test" to the nodes, but using estimates of δs(j), $v_{IN}(j)$ and $v_{OUT}(j)$ that are based on authenticatible records. For example, when one node sends a packet to another node, that exchange may require the creation of an authenticatible record that can later be used to estimate δs(j), $v_{IN}(j)$ and $v_{OUT}(j)$.

Similar to the above, δs(j) may be difficult to estimate since it is an internal value at a malicious node. Therefore, an alternate test is:

$$\text{Is } v_{IN}(j) - v_{OUT}(j) > c(j) \text{ for node } Nj? \quad (\text{Test AA2})$$

since c(j) is the maximum value of δs(j).

I.B.2 Case B (Packet Duplication)

Another malicious behavior is where malicious nodes insert duplicate packets without deleting other packets. This will be referred to as the "packet duplication" case, although the tests below may also be triggered by other types of malicious behavior.

Test Conditions: One test for the packet duplication case is:

$$\text{Is } V_S < V_R + \Delta S? \quad (\text{Test B1})$$

Test B1 is accurate, but it relies on an estimate for ΔS, which may not be reliably available or which may take a long time to determine. An alternate test is:

$$\text{Is } V_S < V_R - C? \quad (\text{Test B2})$$

Since (−C) is the minimum possible value for ΔS. Therefore, if Test B2 is true, then Test B1 must also be true. Other estimates for ΔS or min {ΔS} can also be used.

Yet another possible test for the packet duplication case is:

$$\text{Is } V_S < \min\{V_S\}? \quad (\text{Test B3})$$

In this case, the packet flow on the sender side is stalled. One possible cause is that a malicious node is duplicating packets, causing a "traffic jam" within the network.

Isolation Action: If the packet duplication case is identified, then the sender can take remedial actions to determine which node is duplicating packets. In one approach, the sender determines which node(s) are violating Eqn. (1B) above by applying the test $$\text{Is } v_{IN}(j) < v_{OUT}(j) + \delta s(j) \text{ for node } Nj? \quad (\text{Test BB1})$$

If the test is satisfied, then that node Nj likely is inserting duplicate packets. The sender applies the above "isolation test" to the nodes, but using estimates of δs(j), $v_{IN}(j)$ and $v_{OUT}(j)$ that are based on authenticatible records. For example, when one node sends a packet to another node, that exchange may require the creation of authenticatible records that can later be used to estimate δs(j), $v_{IN}(j)$ and $v_{OUT}(j)$.

Similar to the above, δs(j) may be difficult to estimate since it is an internal value at a malicious node. Therefore, an alternate test is:

Is $v_{IN}(j) < v_{OUT}(j) - c(j)$ for node $Nj$? (Test BB2)

since $-c(j)$ is the minimum value of δs(j).

I.B.3 Case C (Packet Substitution)

Another malicious behavior is where malicious nodes delete packets but then insert an equal number of duplicate packets. This will be referred to as the "packet substitution" case, although the tests below may also be triggered by other types of malicious behavior. Tests based purely on accounting for the number of packets may have difficulty identifying the presence of this type of behavior because the numbers of packets are not changed. Therefore, detection typically is based on specific characteristics of the particular protocol P.

Test Conditions: For example, the protocol P might require that, if the network is honest, then receiver R will receive each packet sent by sender S at most once. Thus, a test for packet substitution might be the absence of packet duplication, coupled with Has receiver R received any packet more than once? (Test C1)

Isolation Action: Assume that R received packet #125 three times. The corresponding isolation action is that each node may be evaluated to determine how many times it has received packet #125 and how many times it has sent packet #125. If protocol P prohibits broadcasting and multi-casting, then a node which has sent packet #125 more times than it has received packet #125 likely may be substituting packets (e.g., drop packet #128 and re-insert packet #125). Thus the test might be:

Has node N sent packet #X more times than it has received packet #X? (Test CC1)

In one approach, if node A sends packet #125 to node B, that exchange may require the creation of authenticatible records that can later be used to prove that packet #125 was transferred from node A to node B. These authenticatible records can later be used to determine the result of Test CC1 above.

I.C Combining Cases

Figure 3:
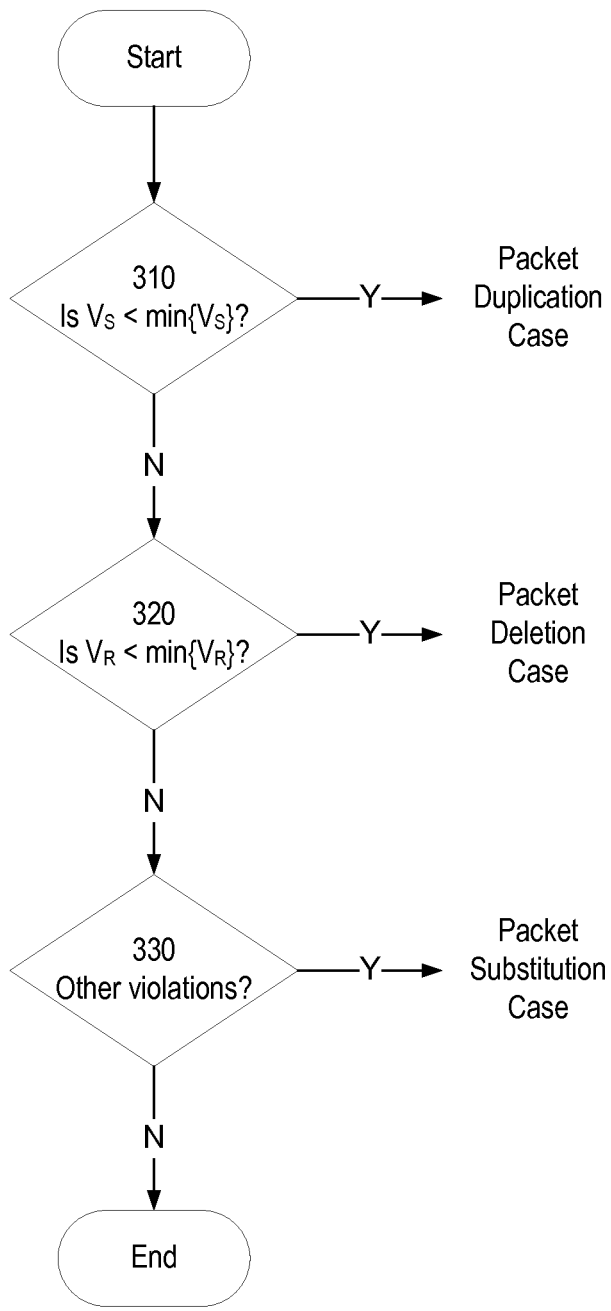
FIG. 3 is a flow diagram of an example protocol combining three test cases.

The tests described above may be used separately or in combination. In one approach, the three cases (and corresponding tests) are used together as shown in FIG. 3. This approach first tests 310 if the number of packets inserted by the sender S during the transmission attempt is less than $\min\{V_S\}$. If so, then the packet duplication case has been identified and action is taken to identify and isolate the malicious node. If not, the approach then tests 320 if the number of packets received by the receiver R is less than $\min\{V_R\}$. If so, then the packet deletion case has been identified and action is taken to identify and isolate the malicious node. If not, the approach then tests 330 for other types of violations, which may indicate a packet substitution case. FIG. 3 is merely an example.

I.D Sender Policing and the Probation List

In one approach, the authenticatible records used to isolate malicious nodes are generated in a distributed fashion when nodes exchange packets. If node A wants to transmit a packet to node B, then node B requires the creation of these authenticatible records before the packet transmission is considered to be complete. For example, assume that the number of packets transferred from A to B during a transmission attempt is used to isolate malicious nodes, and A wants to transfer a packet to B, and this packet would be the $70^{th}$ packet transferred from A to B during this transmission attempt. The protocol P might require A to digitally sign a record that there have been 70 packets transferred thus far and transfer this record to B. B might also be required to digitally sign that there have been 70 packets transferred thus far and transfer this record to A. Each of A and B save these records locally and produce them if requested by the sender S (when the sender S has identified a problem case).

Note that if A is malicious, he cannot change the B-authenticized record that states 70 packets have been transferred from A to B. If A does not want to produce this record, he can only either produce an earlier record (e.g., one that says only 60 packets have been transferred, although this will be contradicted by the A-authenticized record produced by B) or ignore the sender S's request. In the latter case, the sender S can place A on a "probation" list. Nodes on the probation list are suspect. For example, they may be temporarily eliminated from the network (i.e., data transmissions to/from probation nodes are not permitted). In this example, sender S may remove A from the probation list once A sends the requested information to S. Note that A may still be malicious since this example probation list is based on whether a node is responding to a request from sender S. Conversely, an honest node may also be placed on the probation list because, for example, a down edge prevents the honest node from responding. Other rules for the probation list may be used. For example, once placed on the probation list, a node may stay on the list until either the probation node is definitively identified as malicious (in which case it is eliminated from the network) or is verified as non-malicious and reinstated as part of the network.

In some applications, there is no out-of-band data transmission (i.e., the only data transmission is via the data paths between nodes). In these cases, the sender S may bear the primary responsibility for determining which intermediate nodes N are malicious and for eliminating those nodes from the network. Note that this complicates matters because the only data paths are via the (possibly malicious) nodes. For example, if receiver R received fewer packets than its minimum, this is communicated to sender S via the potentially dishonest network. Once the sender S receives this alert, it might query each node looking for missing packets, but these communications also all occur via the potentially dishonest network. After sender S determines which of the nodes should be put on probation or eliminated, this information also is communicated via the network.

In alternate approaches, the responsibility for ensuring an honest network may be shared. For example, intermediate nodes may locally identify, eliminate and/or report malicious nodes.

II. Case Introduction

II.A Problem Statement

The remainder of this detailed description concerns a specific example based on the above principles. This is merely one example and is not meant to limit the invention.

The goal of this particular example is to design a routing protocol for an unreliable and dynamically changing synchronous network that is resilient against malicious adversaries who may try to destroy and alter messages or disrupt communication in any way. We model the network as a communication graph $G=(V, E)$ where each vertex is a node and each edge is a unidirectional communication link. We do not assume that the topology of this graph is fixed or known by the nodes. Rather, we assume a complete graph on n vertices, where some of the edges are up and some are down, and the status of each edge can change dynamically at any time.

We concentrate on the most basic task, namely how two nodes in the network can exchange information. Thus, we assume that there are two designated vertices, the sender S and the receiver R, who wish to communicate with each other. The sender has an indefinite read-once input queue of packets and the receiver has an infinite write-once output queue which is initially empty. We assume that packets are of some bounded size, and that any edge in the system that is up during some round can transmit only one packet (or control variables, also of bounded size) per round.

We evaluate this example protocol using the following three considerations:

Correctness. A protocol is "correct" if the sequence of packets output by the receiver is a prefix of packets appearing on the sender's input queue, without duplication or omission.

Throughput. This measures the number of packets on the output queue as a function of the number of rounds that have passed.

Node Memory. This measures the memory required of each node by the protocol, independent of the number of packets to be transferred.

All three considerations are measured in the worst-case scenario as standards that are guaranteed to exist regardless of adversarial interference. One can also evaluate a protocol based on its dependence on global information to make decisions. In the protocol we describe below, we will not assume there is any global view of the network available to the intermediate nodes (although the sender S may send to all nodes information such as the probation list). Such protocols are termed "local control," in that each node can make all routing decisions based only on the local conditions of its adjacent edges and neighbors.

II.B Adversaries

Our example protocol is designed to be resilient against a malicious, polynomially-bounded adversary who may attempt to impact the correctness, throughput, and memory of the protocol by disrupting links between the nodes or taking direct control over the nodes and forcing them to deviate from protocol in any manner the adversary wishes. For reasons of clarity, we describe two separate (yet coordinated with each other) adversaries.

Edge-Scheduling Adversary. The edge-scheduling adversary controls the edges between nodes. More precisely, at each round, this adversary decides which edges in the network are up and which are down. We will say that the edge-scheduling adversary is "conforming" if for every round there is at least one path from the sender to the receiver (although the path may change each round). In this example case, we assume the edge-scheduling adversary is conforming. The adversary can make any arbitrary poly-time computation to maximize interference in routing, so long as it remains conforming.

Node-Controlling Adversary. The node-controlling adversary controls malicious nodes. More precisely, each round this adversary decides which nodes to corrupt. Once corrupted, a node is assumed to be malicious forever and can behave in an arbitrary malicious manner. We say that the node-controlling adversary is conforming if every round there is a connection between the sender and receiver consisting of edges that is up for the round (as specified by the edge-scheduling adversary) and that passes through only honest nodes. We emphasize that this path can change each round, and there is no other restriction on which nodes the node-controlling adversary may corrupt (allowing even a vast majority of corrupt nodes).

The separation into two separate adversaries is artificial. Our example protocol is secure whether edge-scheduling and corruption of nodes are performed by two separate adversaries that have different capabilities yet can coordinate their actions with each other, or by a single coordinated adversary.

The separation is made for purposes of clarity, since we deal with the challenges they pose to correctness, throughput, and memory in different ways. Namely, aside from the conforming condition, the edge-scheduling adversary cannot be controlled or eliminated. Edges themselves are not inherently "good" or "bad," so identifying an edge that has failed does not allow us to forever refuse the protocol to utilize this edge, as it may come back up at any time (and indeed it could form a crucial link on the path connecting the sender and receiver that the conforming assumption guarantees). In sum, in this particular example, we cannot hope to control or alter the behavior of the edge-scheduling adversary, but must come up with a protocol that works well regardless of the behavior of the ever-present (conforming) edge-scheduling adversary.

By contrast, this example protocol will limit the amount of influence the node-controlling adversary has on correctness, throughput, and memory. Specifically, we will show that if a node deviates from the protocol in a sufficiently destructive manner, then the protocol will be able to identify it as corrupted in a timely fashion. Once a corrupt node has been identified, it will be eliminated from the network. Namely, the protocol will call for honest nodes to refuse communication with nodes that have been identified as corrupt. The conforming assumption guarantees that the sender and receiver are incorruptible, and this example protocol places the responsibility of identifying and eliminating the corrupt nodes on these two nodes.

Thus, there is an inherent difference in how we handle the edge-scheduling adversary versus how we handle the node-controlling adversary. We can restrict the influence of the latter by eliminating malicious nodes, while the former must be dealt with in a more ever-lasting manner.

II.C Malicious Behaviors

In this section, we discuss some potential strategies that the node-controlling and edge-scheduling adversaries may incorporate to disrupt network communication. Although this example protocol will work in the presence of arbitrary malicious activity of the adversarial controlled nodes (except with negligible probability), it is instructive to list a few forms of malicious behavior that the protocol protects against. This list is not intended to be exhaustive. Indeed, we do not claim to know all the specific ways an arbitrary polynomially bounded adversary may force nodes to deviate from a given protocol, although we can rigorously prove that this example protocol is secure against all possible deviations.

Packet Deletion/Modification. Instead of forwarding a packet, a corrupt node "drops it to the floor" (i.e. deletes it or effectively deletes it by forever storing it in memory), or modifies the packet before passing it on. Another manifestation of this is if the sender/receiver requests fault localization information of the intermediate nodes, such as providing documentation of their interactions with neighbors. A corrupt node can then block or modify information that passes through it in an attempt to hide malicious activity or implicate an honest node.

Introduction of Junk/Duplicate Packets. The adversary can attempt to disrupt communication flow and "jam" the network by having corrupted nodes introduce junk packets or re-broadcast old packets. Notice that junk packets can be handled by using authentication techniques (e.g., cryptographic signatures) to prevent introduction of "new" packets, but this does not control the re-transmission of old, correctly authenticized packets.

Disobedience of Transfer Rules. If the protocol specifies how nodes should make decisions on where to send packets, etc., then corrupt nodes can disregard these rules. This includes "lying" to adjacent nodes about their current state.

Coordination of Edge Failures. The edge-scheduling adversary can attempt to disrupt communication flow by scheduling edge failures in any manner that is consistent with the conforming criterion. Coordinating edge failures can be used to impede correctness, memory, and throughput in various ways. For example, packets may become lost across a failed edge, stuck at a suddenly isolated node, or arrive at the receiver out of order. A separate issue arises concerning fault localization. When the sender/receiver requests documentation from the intermediate nodes, the edge-scheduling adversary can slow progress of this information, as well as attempt to protect corrupt nodes by allowing them to "play-dead" (setting all of its adjacent edges to be down), so that incriminating evidence cannot reach the sender.

III. Highlights of an Example Protocol

To our knowledge, there has not been a protocol that has considered simultaneously a network susceptible to faults occurring due to edge-failures and faults occurring due to malicious activity of corrupt nodes. In this particular example, we obtain the first routing protocol simultaneously secure against both an edge-scheduling adversary and a node-controlling adversary, even if these two adversaries attack the network using an arbitrary coordinated poly-time strategy. Furthermore, this example protocol achieves comparable efficiency standards in terms of throughput and node memory as state-of-the-art protocols that are not secure against a node-controlling adversary and does so using local-control protocols.

Figure 4:
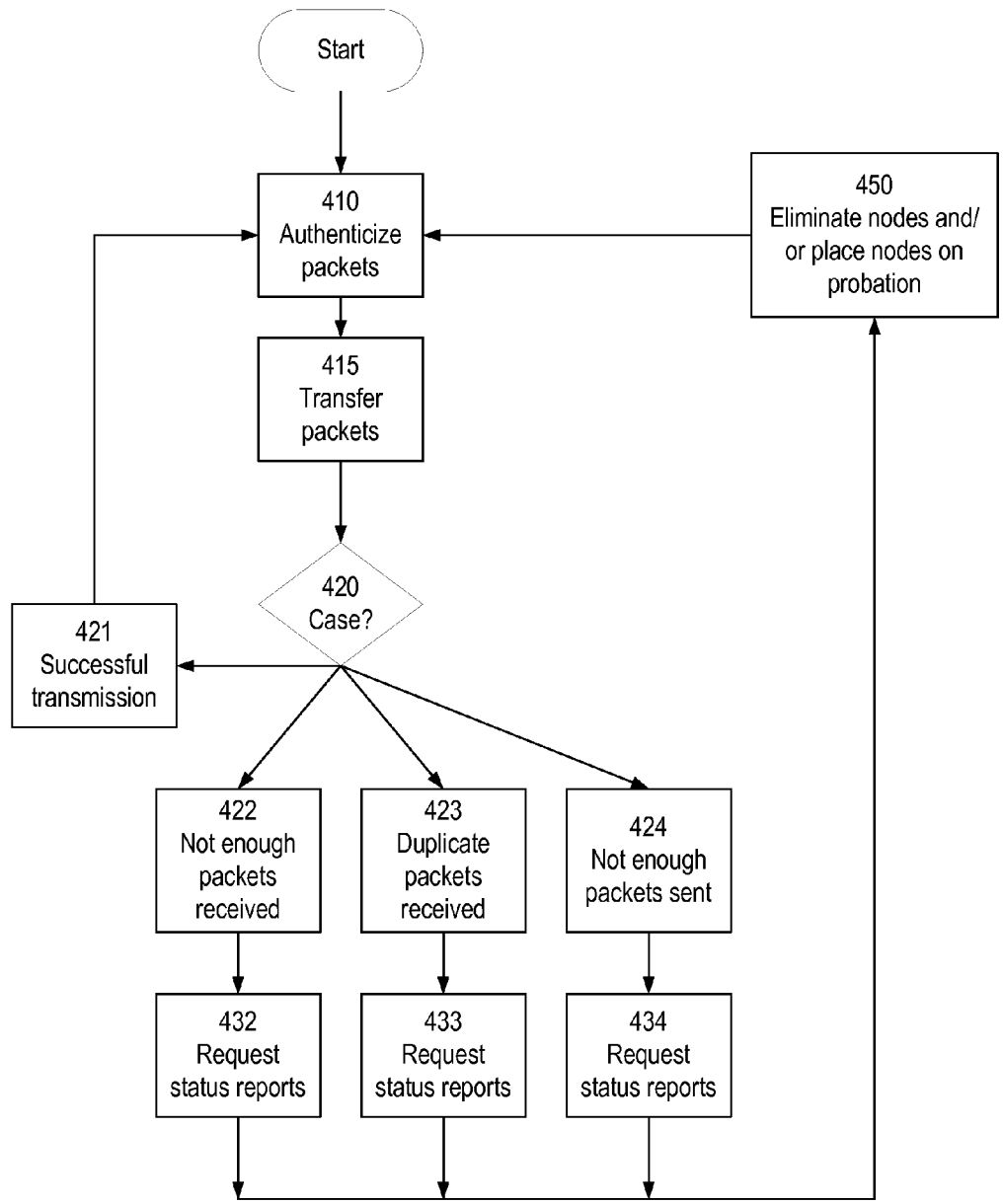
FIG. 4 is a flow diagram of another example protocol.

FIG. 4 is a flow diagram of the example protocol. Our starting point is the Slide protocol. We provide a detailed description of our version of the Slide protocol in later sections, but highlight certain ideas here.

Figure 5:
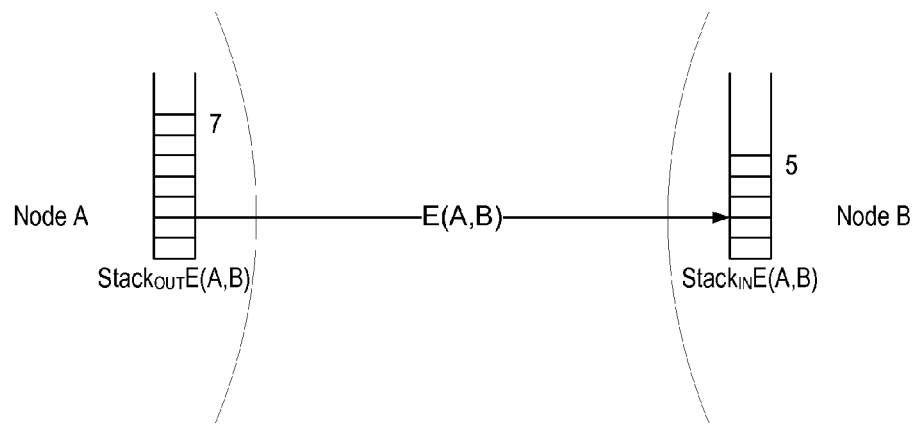
FIG. 5 is a diagram that shows stacks and packet flow across an edge.

Referring to FIG. 5, begin by viewing each link between two nodes as consisting of up to two directed edges, and associate to each end of an edge a stack data-structure able to hold 2n packets and to be maintained by the node at that end. FIG. 5 shows one of the directed edges E(A, B) from node A to node B. The other directed edge would be E(B, A) from node B to node A. The stack maintained by node A is $Stack_{OUT}(A, B)$ and the stack at node B is $Stack_{IN}(A, B)$. In this example protocol, the stacks are first in last out (FILO). In FIG. 5, $Stack_{OUT}(A, B)$ currently has 7 packets and $Stack_{IN}(A, B)$ has 5 packets, although the maximum capacity of each stack (for honest nodes) is 2n.

The protocol specifies the following simple, local condition for transferring a packet across an edge. If there are more packets in the stack at the originating end than the terminating end, transfer a packet across the edge. In FIG. 5, there are 7 packets in $Stack_{OUT}(A, B)$ and only 5 in $Stack_{IN}(A, B)$, so a packet is transferred across edge E(A, B) from node A to node B.

Similarly, within a node's local stacks, packets are shuffled to average out the stack heights along each of its edges. For example, if another stack in node A had 9 packets, then packets could be transferred from that stack to $Stack_{OUT}(A, B)$ to more evenly distribute the packets within node A. The reshuffling is subject to certain rules. For example, packets typically are prohibited from being transferred from an out-bound stack to an inbound stack within a node.

Intuitively, packet movement is analogous to the flow of water. High stacks create a pressure that forces packets to "flow" to neighboring lower stacks. At the source, the sender maintains the pressure by filling his outgoing stacks as long as there is room while the receiver relieves pressure by consuming packets and keeping his stacks empty.

The location of a packet within a stack can be analogized to a potential, which will be referred to as the packet potential. In FIG. 5, the top packet on $Stack_{OUT}(A, B)$ has a packet potential of 7, the packet beneath it has a packet potential of 6, and so on until the bottom packet which has a packet potential of 1. Similarly, the top packet on $Stack_{IN}(A, B)$ has a potential of 5 and so on. Transferring a packet from node A to node B results in a reduction of packet potential of 1, since the packet had a packet potential of 7 on $Stack_{OUT}(A, B)$ but will have a packet potential of 6 when received at $Stack_{IN}(A, B)$. The stack potential is the sum of all packet potentials within the stack. Thus, $Stack_{OUT}(A, B)$ has a stack potential of $7+6+5+\ldots+1$. The node potential is the sum of all packet potentials within the node. Reshuffling packets within the node (according to the rules of this example protocol) results in a reduction of the node potential.

Figure 6:
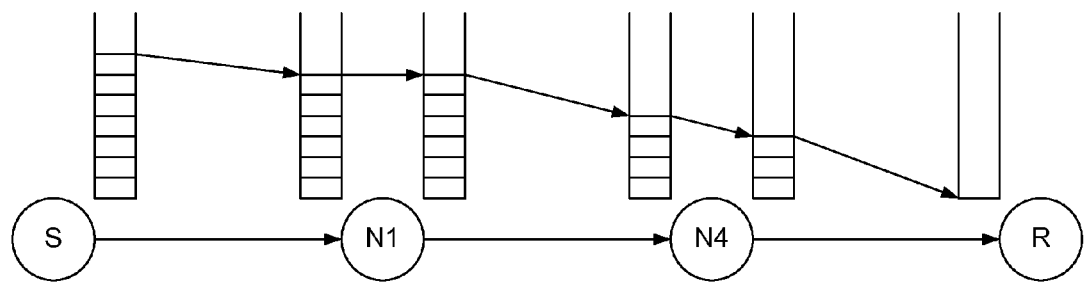
FIG. 6 is a diagram that shows flow from sender to receiver, according to decreasing packet potential.

Loosely speaking, packets will require a very large packet potential (i.e., located at the top of high stacks) in order to be transmitted to nodes "near" the sender, packets will require only a small packet potential in order to be transmitted to nodes near the receiver, and packet transfers near intermediate nodes will require moderate packet potentials. Assuming the packets have sufficient packet potentials, packets will pass from the sender with a high packet potential, and then "flow" downwards across nodes requiring less packet potential, all the way to the receiver, as shown in FIG. 6.

Because the Slide protocol provides a fully distributed protocol that works well against an edge-scheduling adversary, we begin by extending the protocol by using digital signatures to provide resilience against Byzantine attacks and arbitrary malicious behavior of corrupt nodes. We give a detailed explanation of our techniques in later sections. However, below we first give a sample of some of the ideas we used to ensure this example protocol would be provably secure against a node-controlling adversary, and yet not significantly affect throughput or memory, compared to the original Slide protocol.

Addressing the "Coordination of Edge-Scheduling" Issues. In the absence of a node-controlling adversary, the Slide protocol is secure and efficient against an edge-scheduling adversary, and it is useful to discuss how some of the challenges posed by a network with a dynamic topology are handled. First, note that the total capacity of the stack data-structure is bounded by $4n^3$. That is, each of the n nodes can hold at most 2n packets in each of their 2n stacks (along each edge) at any time.

To handle the loss of packets due to an edge going down while transmitting a packet, a node maintains a copy of each packet it transmits along an edge until it receives confirmation from the neighbor of successful receipt.

To handle packets becoming stuck in some intermediate node's stack due to edge failures, error-correction is utilized to allow the receiver to decode a full message without needing every packet. In particular, if an error-correcting code allowing a fraction of $\lambda$ faults is utilized, then since the capacity of the network is $4n^3$ packets, if the sender is able to pump $4n^3/\lambda$ codeword packets into the network and there is no malicious deletion or modification of packets, then the receiver will necessarily have received enough packets to decode the message.

The Slide protocol has a natural bound in terms of memory per node of $O(n^2 \log n)$ bits, where the bottleneck is the possibility of a node holding up to $2n^2$ packets in its stacks, where each packet requires $O(\log n)$ bits to describe its position in the code.

These techniques are only valid if nodes are acting honestly, which leads to certain extensions.

Handling Packet Modification and Introduction of Junk Packets. Before inserting any packets into the network, the sender authenticizes 410 each packet using his digital signature. Intermediate nodes and the receiver do not accept or forward messages not appropriately signed. This simultaneously prevents honest nodes from becoming bogged down with junk packets, as well as ensuring that if the receiver has obtained enough authenticized packets to decode, a node-controlling adversary cannot impede the successful decoding of the message as the integrity of the codeword packets is guaranteed by the inforgibility of the sender's signature.

Fault Detection. In the absence of a node-controlling adversary, this example protocol is similar to the Slide protocol, with the addition of authentication that accompanies interactions between two nodes. The sender attempts to pump the $4n^3/\lambda$ codeword packets of the first message into the network, with packet movement 415 as in the original Slide protocol. We consider 420 all possible outcomes:

(Case 421 in FIG. 4) The sender is able to insert all codeword packets and the receiver is able to decode. In this case, the message was transmitted successfully, and the protocol moves to transfer the next message.

(Case 422) The sender is able to insert all codeword packets, but the receiver has not received enough to decode. In this case, the receiver floods the network with a single-bit message indicating possible packet deletion has occurred.

(Case 423) The sender is able to insert all codeword packets, but the receiver cannot decode because he has received duplicate packets. Although the sender's authenticating signature guarantees the receiver will not receive junk or modified packets, a corrupt node is able to duplicate valid packets. Therefore, the receiver may receive enough packets to decode, but cannot because he has received duplicates. In this case, the receiver floods the network with a single message indicating the identifier of a duplicated packet.

(Case 424) After some amount of time, the sender still has not inserted all codeword packets. In this case, the duplication of old packets is so severe that the network has become jammed, and the sender is prevented from inserting packets even along the honest path that the conforming assumption guarantees. If the sender believes the jamming cannot be accounted for by edge-failures alone, he will halt transmission and move to isolating a corrupt node. In certain cases, a lower bound on the insertion rate of the sender for the Slide protocol in the absence of the node-controlling adversary can be proved. This bound not only alerts the sender when the jamming he is experiencing exceeds what can be expected in the absence of corrupt nodes, but it also provides a mechanism for isolating the malicious node(s).

The above four cases 421-424 exhaust all possibilities. Furthermore, if a transmission is not successful, the sender is not only able to detect the fact that malicious activity has occurred, but he is also able to distinguish the form of the malicious activity, i.e. which of the cases 422-424 applies. Meanwhile, for case 421 (successful transmission), this example protocol enjoys (within a constant factor) an equivalent throughput rate as the original Slide protocol.

Fault Isolation. Once a fault has been detected, it remains to describe how to localize the problem to the offending node. To this end, we use digital signatures to achieve a mechanism we call "Routing with Responsibility." By forcing nodes to sign certain records for communications with their neighbors during the transfer of packets, they can later be held accountable for their actions. In particular, once the sender has identified the reason for failure (cases 422-424 above), he will request 432-434 (as applicable) intermediate nodes to return status reports, which include the relevant authenticized records about the communications with their neighbors. We can mathematically prove in each case that with a complete set of status reports from every node, the sender can with overwhelming probability identify and eliminate a corrupt node. Of course, malicious nodes may choose not to send incriminating information. We handle this separately as explained below.

Throughout this description, we use public-key operations to sign individual packets with control information. Typically, this is too expensive to do per-packet in practice. There are conventional methods of amortizing the cost of signatures by signing "batches" of packets, using private-key initialization, or using a combination of private-key and public key operations, such as "on-line/off-line" signatures. It should be recognized that the use of these techniques is expected within the scope of the invention. However, for the sake of clarity, this description is restricted to the straight-forward public-key setting without considering these additional cost-saving techniques.

Incomplete Information. As already mentioned, we show that regardless of the reason of failure 422-424 above, once the sender receives the status reports from every node, a corrupt node can be identified. However, this relies on the sender obtaining all of the relevant information; the absence of even a single node's information might prevent the localization of a fault. We address this challenge in the following ways:

First, we minimize the amount of information the sender requires of each node. This way, a node need not be connected to the sender for very many rounds in order for the sender to receive its information. Specifically, regardless of the reason for failure 422-424 above, a status report consists of at most n pieces of information from each node, i.e. one packet for each of its edges.

Second, if the sender does not have the n pieces of information from a node, it cannot afford to wait indefinitely. After all, the edge-scheduling adversary may keep the node disconnected indefinitely, or a corrupt node may simply refuse to respond. For this purpose, we create a "probation list" for non-responding nodes, which will disallow them from transferring codeword packets in the future. This way, anytime the receiver fails to decode a codeword as in cases 422-424 above, the sender can request 432-434 the information he needs, place 450 on the probation list nodes not responding within some short amount of time, and then re-attempt to transmit the codeword using only nodes that have not been eliminated as malicious and that are not on probation.

Nodes should not transfer codeword packets to probation nodes, but they do still communicate with them to transfer the information the sender has requested. If a new transmission again fails, the sender requests information from nodes that were participating, i.e. he does not collect new information from probation nodes (although the nodes will remain on probation until the sender gets the original information he requested of them). A node is removed from probation and re-allowed to route codeword packets once the sender receives the requested status report.

The Probation List. We want to place malicious nodes "playing-dead" on probation, while at the same time we do not want honest nodes that are temporarily disconnected from being on this list for too long. We can prove that the occasional honest node that gets put on the probation list will not significantly hinder packet transmission. Intuitively, this is true because any honest node that is an important link between the sender and receiver will not remain on the probation list for very long, as his connection to the sender guarantees the sender will receive all requested information from the node in a timely manner.

Ultimately, the probation list allows us to control the amount of malicious activity a single corrupt node can implement before being eliminated or at least placed on probation. Indeed, we can show that each failed message transmission (cases 422-424 above) can be localized (eventually) to (at least) one corrupt node. More precisely, the probation list allows us to argue that malicious activity can cause at most n failed transmissions before a corrupt node can necessarily be identified and eliminated. Since there are at most n corrupt nodes, this bounds the number of filed transmissions at $n^2$. The result of this is that other than at most $n^2$ failed message transmissions, this example protocol enjoys the same throughput efficiency of the unmodified Slide protocol.

IV. Formal Model for the Example Protocol

It is useful to describe two models in this section, one in the presence of an edge-scheduling adversary (where all nodes act "honestly"), and one in the presence of an adversary who may "corrupt" some of the nodes in the network. In the following sections, we present an efficient protocol that works well in the edge-scheduling adversarial model, and we then extend this protocol in the next section to work in the additional presence of the node-controlling adversary.

IV.A The Edge-Scheduling Adversarial Model

We model a communication network by an undirected graph G=(V, E), where |V|=n. Each vertex in the graph represents a network node that is capable of storing information (in its buffers) and passing information to other nodes along the edges. We distinguish two nodes, the sender, denoted by S, and the receiver, denoted by R. In our model, S has an input stream of messages $\{m_1, m_2, \ldots\}$ of uniform size that he wishes to transmit through the network to R. As mentioned above, the three qualities we care about are Correctness, Throughput, and Node Memory.

We assume a synchronous network, so that effectively there is a universal clock that each node has access to. Although synchronous networks are difficult to realize in practice, we can further relax the model to one in which there is a known upper-bound on the amount of time an active edge can take to transfer a packet. The global time is divided into discrete chunks, called rounds, during which nodes communicate with each other and transfer packets. Each round consists of two stages. Nodes are synchronized in terms of when each stage begins and ends. We assume that the edges have some fixed capacity P in terms of the amount of information that can be transmitted across them per stage. The messages are sub-divided into packets of uniform size P, so that exactly one packet can be transferred along an edge per stage.

A later example protocol for the node-controlling adversarial model will require the packets to include signatures from a cryptographic signature scheme. The security of such schemes depend on the security parameter k, and the size of the resulting signatures have size O(k). Additionally, error-correction will require packets to carry with them an index of O(log n) bits. Therefore, we assume that $P \geq (k+\log n)$, so that in each time step a complete packet (with signature and index) can be transferred.

The purpose of the network is to transmit the messages from S to R, so S is the only node that introduces this set of messages into the network, and R is the only node that removes them from the network (although below we introduce a node-controlling adversary who may corrupt the intermediate nodes and attempt to disrupt the network by illegally deleting/introducing messages). Although the communications links in our model may be bidirectional, it is useful to consider each bidirectional link as consisting of two directed edges. Except for the conforming restriction, we allow the edges of our network to fail and resurrect arbitrarily. We model this via an Edge-Scheduling Adversary, who controls the status of each edge of the network, and can alter the state of any edge at any time. We say that an edge is active (or up) during a given stage/round if the edge-scheduling adversary allows that edge to remain up for the entirety of that stage/round.

We impose one restriction on the failure of edges. An edge-scheduling adversary is "conforming" if, for every round of the protocol, there exists at least one path between S and R consisting of edges that are active for the entirety of the round.

For a given round t, we will refer to the path guaranteed by the conforming assumption as the "active path" of round t. Notice that although the conforming assumption guarantees the existence of an active path for each round, it is not assumed that any node (including S and R) is aware of what that path is. Furthermore, this path may change from one round to the next. The edge-scheduling adversary cannot affect the network in any way other than controlling the status of the edges. In the next section, we introduce a node-controlling adversary who can take control of the nodes of the network.

IV.B The Node-Controlling+Edge-Scheduling Adversarial Model

This model begins with the edge-scheduling adversarial model described above, and adds a polynomially bounded Node-Controlling Adversary that is capable of controlling nodes in the network. The node-controlling adversary is malicious, meaning that the adversary can take complete control over the nodes he corrupts, and can therefore force them to deviate from any protocol in whatever manner he likes. We further assume that the adversary is dynamic, which means that he can corrupt nodes at any stage of the protocol, deciding which nodes to corrupt based on what he has observed thus far. Although the node-controlling adversary is dynamic, he is still constrained by the conforming assumption. Namely, the adversary may not corrupt so many nodes that there is no longer an active path connecting sender and receiver for every round of transmission.

Apart from this restriction, the node-controlling adversary may corrupt whoever he likes. Note that the conforming assumption implicitly demands that S and R are incorruptible, since they are always a part of any active path. Also, this restriction on the adversary is really more a statement about when our provable results remain valid. Once corrupted, a node is forever considered to be a corrupt node that the adversary has total control over (although the adversary may choose to have the node act honestly).

Notice that because correctness, throughput, and memory are the only qualities that are set as goals for this example protocol, an honest-but-curious adversary is completely benign, as privacy does not need to be protected. Indeed, any intermediate node is presumed to be able to read any packet that is passed through it. If desired, privacy can be added by encrypting all packets. Our techniques for preventing/detecting malicious behavior is to incorporate a digital signature scheme that will serve the dual purpose of validating information that is passed between nodes, as well as holding nodes accountable for information that their signature committed them to.

We assume that there is a Public Key Infrastructure (PKI) that allows digital signatures. In particular, before the protocol begins we choose a security parameter k sufficiently large and run a key generation algorithm for a digital signature scheme, producing n=|G| (secret key, verification key) pairs $(sk_N, vk_N)$. As output to the key generation, each node $N \in G$ is given its own private signing key $sk_N$ and a list of all n signature verification keys $vk_{\hat{N}}$ for all nodes $\hat{N} \in G$. In particular, this allows the sender and receiver to sign messages to each other that cannot be forged (except with negligible probability in the security parameter) by any other node in the system.

V. Example Routing Protocol in the Edge-Scheduling Adversarial Model

In this section we formally describe an example edge-scheduling protocol, which is based on the Slide protocol.

V.A Definitions and High-Level Description

The goal of the protocol is to transmit a sequence of messages $\{m_1, m_2, \dots\}$ of uniform size from the sender S to the receiver R. Each node will maintain a stack (i.e. FILO buffers) along each of its edges that can hold up to 2n packets concurrently. To allow for packets to become stuck in the buffers, we will utilize error-correction. Specifically, the messages $\{m_1, m_2, \dots\}$ are converted into codewords $\{c_1, c_2, \dots\}$, allowing the receiver to decode a message provided he has received an appropriate number (depending on the information rate and error-rate of the code) of bits of the corresponding codeword. We assume the existence of an error-correcting code with information rate $\sigma$ and error rate $\lambda$.

As part of the setup of this example protocol, we assume that the messages $\{m_1, m_2, \dots\}$ have been partitioned to have uniform size $$M = \frac{6\sigma P n^3}{\lambda}$$

(recall that P is the capacity of each edge and $\sigma$ and $\lambda$ are the parameters for the error-correction code). The messages are expanded into codewords, which will have size $$C = \frac{M}{\sigma} = \frac{6Pn^3}{\lambda}.$$

The codewords are then divided into $$\frac{C}{P} = \frac{6n^3}{\lambda}$$

packets of size P. We define this quantity for later use:

$$D := \frac{6n^3}{\lambda} = \text{number of packets per codeword.} \quad (2)$$

The only "noise" in our network results from undelivered packets or outdated packets (in the edge-scheduling adversarial model, any packet that R receives has not been altered). Therefore, since each codeword consists of $$D = \frac{6n^3}{\lambda}$$

packets, by definition of $\lambda$, if R receives $$(1-\lambda)D = (1-\lambda)\left(\frac{6n^3}{\lambda}\right)$$

packets corresponding to the same codeword, he is able to decode the codeword to obtain the corresponding message.

Because our model allows for edges to go up/down, the example protocol forces each node to keep incoming and outgoing buffers for every possible edge, even if that edge is not part of the graph at the outset. We introduce now the notion of height of a stack, which is used to determine when packets are transferred and how packets are re-shuffled between the internal stacks of a given node between rounds. The "height" of an incoming/outgoing stack is the number of packets currently stored in that stack.

The presence of an edge-scheduling adversary that can force edges to fail at any time complicates the interaction between the nodes. Note that our model does not assume that the nodes are aware of the status of any of its adjacent edges, so failed edges can only be detected when information that was supposed to be passed along the edge does not arrive. We handle potential edge failures as follows. First, the incoming/outgoing stacks at either end of an edge are given a "status" (normal or problem). Also, to account for a packet that may be lost due to edge failure during transmission across that edge, a node at the receiving end of a failed edge may have to leave room in its corresponding incoming stack. We refer to this gap as a ghost packet, but emphasize that the height of an incoming stack is not affected by ghost packets. By definition, height (and also potential) only counts packets that are present in the stack. Similarly, when a sending node "sends" a packet across an edge, it actually only sends a copy of the packet, leaving the original packet in its outgoing stack. We will refer to the original copy left in the outgoing stack as a flagged packet, and note that flagged packets continue to contribute to the height (and also potential) of an outgoing stack until they are deleted.

The codewords are transferred sequentially, so that at any time, the sender is only inserting packets corresponding to a single codeword. We will refer to the rounds for which the sender is inserting codeword packets corresponding to the $i^{th}$ codeword as the $i^{th}$ transmission attempt. It can be proven that after the sender has inserted $D-2n^3$ packets corresponding to the same codeword, the receiver can necessarily decode. Therefore, when the sender has inserted this many packets corresponding to codeword $b_i$, he will clear his outgoing stacks and begin distributing packets corresponding to the next codeword $b_{i+1}$.

V.B Detailed Description of the Edge-Scheduling Protocol

We describe now the two main parts of the example edge-scheduling adversarial routing protocol: the Setup Phase and the Routing Phase. For a formal presentation of the pseudo-code, see Section VIII.

V.B.1 Setup Phase

Each intermediate (i.e. not S or R) node has the following stacks:

Incoming Stacks. Recall that we view each bi-directional edge as consisting of two directed edges. Then for each incoming edge, a node will have a stack that has the capacity to hold 2n packets at any given time. Additionally, each incoming stack is able to store a "Status" bit, the label of the "Last-Received" packet, and the "Round-Received" index (the round in which this incoming stack last accepted a packet). The way that this additional information is used is described in the "Routing Rules for Receiving Node" section below.

Outgoing Stacks. For each outgoing edge, a node will have a stack that has the capacity to hold 2n packets at any given time. Like incoming stacks, each outgoing stack will also be able to store a status bit, the index label of one packet (called the "Flagged" packet), and a "Problem-Round" index (index of the most recent round in which the status bit switched to 1).

The receiver will only have incoming stacks with capacity of one, and a large Storage Stack that can hold up to D packets. Similarly, the sender has only outgoing stacks with capacity 2n, and the input stream of messages $\{m_1, m_2, \ldots\}$ which are encoded into the codewords and divided into packets, the latter then distributed to the sender's outgoing stacks.

Also as part of the Setup, all nodes learn the relevant parameters (P, n, $\lambda$, and $\sigma$).

V.B.2 Routing Phase

We assume a synchronous network, so that there are well-defined rounds in which information is passed between nodes. Each round consists of two units of time, called Stages. The formal treatment of the Routing Phase can be found in the pseudo-code in Section VIII. FIG. 7 is a diagram that considers a directed edge E(A, B), and describes what communication each node sends in each stage.

In addition to this communication, each node also updates its intermediate state based on the communication it receives. In particular, from the communication A receives from B in Stage 1 of any round, A can determine if B has received the most recent packet A sent. If so, A will delete this packet and switch the status of the outgoing stack along this edge to "normal." If not, A will keep the packet as a flagged packet, and switch the status of the outgoing stack along this edge to "problem." At the other end, if B does not receive A's Stage 1 communication or B does not receive a packet it was expecting from A in Stage 2, then B will leave a gap in its incoming stack (termed a "ghost packet") and will switch this stack's status to "problem." On the other hand, if B successfully receives a packet in Stage 2, it will switch the stack back to "normal" status.

V.B.3 Re-Shuffle Rules

At the end of each round, nodes will shuffle the packets they are holding according to the following rules:

1. Take a packet from the fullest stack (i.e., the stack with greatest height) and shuffle it to the emptiest stack (i.e., the stack with the lowest height), provided the difference in height is at least (a) two if the packet is moved between two stacks of the same type, or (b) at least one if the packet moves from an incoming stack to an outgoing stack. Packets will never be re-shuffled from an outgoing stack to an incoming stack. If two (or more) stacks are tied for having the most packets, then a packet will preferentially be chosen from incoming stacks over outgoing stacks (ties are broken in round-robin fashion). Conversely, if two (or more) stacks are tied for the emptiest stack, then a packet will preferentially be given to outgoing stacks over incoming stacks (again, ties are broken in round-robin fashion).

2. Repeat the above step until no more shuffling takes place.

Recall that when a packet is shuffled locally between two stacks, packets travel in a FILO manner, so that the top-most packet of one stack is shuffled to the top spot of the next stack. When an outgoing stack has a flagged packet or an incoming stack has a ghost packet, we use instead the following modifications to the above-re-shuffle rules. Recall that in terms of measuring a stack's height, flagged packets are counted but ghost packets are not.

A. Outgoing stacks do not shuffle flagged packets. In particular, if Rule 1 above selects to transfer a packet from an outgoing stack, the top-most non-flagged packet is shuffled. This may mean that a gap is created between the flagged packet and the next non-flagged packet.

B. Incoming stacks do not re-shuffle ghost packets. In particular, ghost packets will remain in the incoming stack that created them, although we do allow ghost packets to slide down within its incoming stack during re-shuffling. Also, packets shuffled into an incoming stack are not allowed to occupy the same slot as a ghost packet. They will take the first non-occupied slot.

Note that because ghost packets do not count towards height, there may appear to be a danger that the re-shuffle rules may dictate a packet gets transferred into an incoming stack, and this packet either has no place to go (because the ghost packet occupies the top slot) or the packet increases in height. However, because only incoming stacks are allowed to re-shuffle packets into other incoming stacks, and the difference in height must be at least two when this happens, neither of these troublesome events can occur.

The sender and receiver have special rules for re-shuffling packets. The sender will fill each of his outgoing stacks (in an arbitrary order) with packets corresponding to the current codeword. Meanwhile, the receiver will empty all of its incoming stacks into its storage stack. If at any time R has received enough packets to decode a codeword $b_i$ (this amount is at most D$-6n^3$), then R outputs message $m_i$ and deletes all packets corresponding to codeword $b_i$ from its storage stack that he receives in later rounds.

V.C Performance of the Edge-Scheduling Adversarial Protocol

We now evaluate this example edge-scheduling protocol in terms of the three measurements of performance: correctness, throughput, and node memory. The throughput standard expressed below will serve an additional purpose when we move to the node-controlling adversary setting: The sender will know that malicious activity has occurred when the throughput standard is not observed. Both of the results below can be proved rigorously.

Throughput. Each message $m_i$ takes at most 3D rounds to pass from the sender to the receiver. In particular, after O(xD) rounds, R will have received at least O(x) messages. Since each message has size $$M = \frac{6\sigma}{\lambda} Pn^3 = O(n^3) \text{ and } D = \frac{6n^3}{\lambda} = O(n^3),$$

after O(x) rounds, R has received O(x) bits of information, and thus this example edge-scheduling adversarial protocol enjoys a linear throughput rate.

Correctness. The throughput result also implicitly states that this example edge-scheduling protocol is correct.

Node Memory. For completeness, we also state the memory requirements of this example edge-scheduling protocol, which is bottlenecked by the $O(n^2)$ packets that each intermediate node has the capacity to store in its stacks. This example edge-scheduling protocol requires at most $O(n^2 \log n)$ bits of memory of the intermediate nodes.

VI. Example Routing Protocol in the (Node-Controlling+Edge-Scheduling) Adversarial Model

VI.A Definitions and High-Level Description

In this section, we define variables and describe how they are used.

As in the protocol for the edge-scheduling adversary model, the sender first converts the input stream of messages into codewords, and then transmits a single codeword at a time. The sender will allow (at most) 4D rounds for this codeword to reach the receiver (for the edge-scheduling protocol, we only allowed 3D rounds; the extra D rounds is motivated below). We will call each attempt to transfer a codeword a "transmission attempt," usually denoted by T. At the end of each transmission attempt, the receiver will broadcast an end of transmission message, indicating whether it could successfully decode the codeword. In the case that the receiver cannot decode, we will say that the transmission failed, and otherwise the transmission was successful.

As mentioned above, in the presence of a node-controlling adversary, digital signatures are used to authenticate the sender's packets and also accompany packet transfers for later use to identify corrupt nodes. In the case a transmission fails, the sender will determine the reason for failure (cases 422-424 from FIG. 4 and also F2-F4 below), and request nodes to return status reports regarding communication between each node and its neighbors. We will also refer to status report packets as "parcels" to clarify discussion in distinguishing them from the codeword packets.

We give now a brief description of how we handle transmission failures in each of the three cases:

F2. The receiver could not decode, and the sender has inserted less than D packets F3. The receiver could not decode, the sender has inserted D packets, and the receiver has not received any duplicated packets corresponding to the current codeword F4. The receiver could not decode and cases F2 and F3 do not happen Below is a short description of the specific kind of information intermediate nodes are required to sign and store when communicating with their neighbors, and how this information is used to identify corrupt nodes in each case F2-F4.

Case F2. Anytime a packet at height h in an outgoing stack of A is transferred to an incoming stack of B at height h', A's node potential will drop by h and B's node potential will increase by h'. So for edge E(A, B), A and B each keep two values, the cumulative decrease in A's potential from packets leaving A, and the cumulative increase in B's potential from those packets entering B. These quantities are updated every time a packet is transferred across the edge, along with a tag indicating the round index and a signature from the neighbor validating the quantities and round index. Loosely speaking, case F2 corresponds to packet duplication. If a corrupt node attempts to slow transmission by duplicating packets, that node will have introduced extra potential in the network that cannot be accounted for, and the signing of potential changes will allow us to identify such a node.

As another example, consider a malicious node X that has one edge E(X, A) connected to a node A close to the sender and another edge E(B, X) connected to a node B close to the receiver. This node X might artificially depress the height of its incoming stack on edge E(B, X). In this way, node X can cause packets from node B to detour to node X instead of to the receiver. Similarly, node X might artificially increase the height of its outgoing stack on edge E(X, A). In this way, node X can reintroduce these packets into node A, which is near the sender. Thus, node X can recycle packets within the network, receiving them from node B near the receiver and reintroducing them at node A near the sender, thus causing a traffic jam. This type of behavior can be detected by examining the potential changes for node X, since there is a significant increase in potential each time a packet is transferred from $\text{Stack}_{IN}(B, X)$ at an artificially low height to $\text{Stack}_{OUT}(X, A)$ at an artificially high height.

Case F3. A and B will keep track of the net number of packets that have traveled across edge E(A, B). This number is updated any time a packet is passed across the edge, and the updated quantity, tagged with the round index, is signed by both nodes, who need only store the most recent quantity. Loosely speaking, case F3 corresponds to packet deletion. In particular, the information signed here is used to find a node that inputs more packets than it outputs, and such that the node's capacity to store packets in its stacks cannot account for the difference.

Case F4. For each packet p corresponding to the current codeword, A and B will keep track of the net number of times the packet p has traveled across edge E(A, B). This quantity is updated every time p flows across the edge, and the updated quantity, tagged with the round index, is signed by both nodes, who for each packet p need only store the most recent quantity. Whenever case F4 occurs, the receiver will have necessarily received a duplicated packet (corresponding to the current codeword). Therefore, the information signed here will allow the sender to track this duplicated packet, looking for a node that outputted the packet more times than it inputted the packet.

It can be proven that whenever cases F2-F4 occur, if the sender has all of the relevant quantities specified above, then he will necessarily be able to identify the corrupt node(s). Notice that each case of failure requires each node to transfer back only one signed quantity for each of its edges, and so the sender only needs n status report packets from each node.

It can also be shown that the maximum number of failed transmissions that can occur before a corrupt node is necessarily identified and eliminated is n. More specifically, the sender can eliminate a corrupt node as soon as he has received the status reports from every non-probation node. The reason we require up to n transmission attempts to guarantee the identification of a corrupt node is that it may take this long for the sender to have the complete information he needs. Because there are fewer than n nodes that can be corrupted by the adversary, the cumulative number of failed transmissions is bounded by $n^2$. This provides us with important observations regarding efficiency, stated precisely below. Note that the additive term that appears there comes from the $n^2$ failed transmissions.

VI.B Detailed Description of the Node-Controlling+Edge-Scheduling Protocol

In this section we give a more thorough description of this example routing protocol for the node-controlling+edge-scheduling adversary model. Formal pseudo-code can be found in Section IX.

VI.B.1 Setup Phase

As in the edge-scheduling protocol, the sender has a sequence of messages $\{m_1, m_2, \ldots\}$ that he will divide into codewords $\{b_1, b_2, \ldots\}$. However, we demand each message has size $$M' = \frac{6\sigma(P-2k)n^3}{\lambda},$$

so that codewords have size $$C' = \frac{M'}{\sigma},$$

and these are then divided into packets of size P'=P−2k, which will allow packets to have enough room to hold two signatures of size k. The network is equipped with some minimal bandwidth, by which we mean the number of bits that can be transferred by an edge in a single round. We will divide codewords into blocks of this size and denote the size by P, which therefore simultaneously denotes the size of any packet and also the network bandwidth. As in the edge-scheduling protocol, we assume P>O(k+log n), so that P' is well-defined Notice that the number of packets per codeword is $$D = \frac{C'}{P'} = \frac{6(P-2k)n^3}{(P-2k)\lambda} = \frac{6n^3}{\lambda},$$

which matches the value of D for the edge-scheduling protocol. One of the signatures that packets will carry with them comes from the sender, who will authenticize every packet by signing it, and the packets will carry this signature until they are removed from the network by the receiver.

We re-emphasize the following fact from the edge-scheduling protocol, which remains true with these new values. If the receiver has obtained $$D - 6n^3 = (1-\lambda)\left(\frac{6n^3}{\lambda}\right)$$

distinct and un-altered packets from any codeword, he is able to decode the codeword to obtain the corresponding message.

The primary difference between this protocol and the edge-adversarial-only protocol is the need to maintain and transmit information that will allow the sender to identify corrupt nodes. To this end, as part of the Setup, each node will have additional buffers:

Signature Buffers. Each node has a signature buffer along each edge to keep track of (outgoing/incoming) information exchanged with its neighbor along that edge. The signature buffers will hold information corresponding to changes in the following values for a single transmission attempt. The following considers A's signature buffer along edge E(A, B):
1) The net number of packets passed across E(A, B);
2) B's cumulative change in potential due to packet transfers across E(A, B).
3) Additionally, for codeword packets corresponding to the current transmission attempt only, the signature buffers will hold: For each packet p that A has seen, the net number of times p has passed across E(A, B) during the current transmission attempt.

Each of the three items above, together with the current round index and transmission index, have been signed by B. Since only a single (value, signature) pair is required for items 1)-2), while item 3) requires a (value, signature) pair for each packet, each signature buffer will need to hold at most 2+D (value, signature) pairs.

Broadcast Buffer. This is where nodes will temporarily store their neighbor's (and their own) state information that the sender will request to identify malicious activity. A node A's broadcast buffer is able to hold the following (signed) information:
1) One end of transmission parcel (described below);
2) Up to n different start of transmission parcels (described below);
3) A list of probation nodes and the transmission attempt for which they were placed on probation or removed from probation;
4) For each B ∈ G, a list of nodes for which B has claimed knowledge of their status report; and
5) For each B ∈ G (including B=A), A's broadcast buffer can hold the content of up to n slots of B's signature buffer.

Additionally, the broadcast buffer will also keep track of the edges across which it has already passed broadcasted information.

Data Buffer. This keeps a list of
1) All nodes that have been identified as corrupt and eliminated from the network by the sender;
2) Current list of nodes on probation; and
3) Each node A ∈ G will keep track of all pairs ($N_1$, $N_2$) such that $N_2$ is on probation, and $N_1$ claims to know $N_2$'s complete status report.

The sender's buffers are the same as in the edge-scheduling protocol's Setup, with the addition of four more buffers:

Data Buffer. Stores all necessary information from the status reports, as well as additional information it will need to identify corrupt nodes. Specifically, the sender's data buffer is able to hold:
1) For up to n transmissions, up to n status report parcels from each node;
2) For up to n transmissions, the reason for failure, including the label of a duplicated packet (if relevant);
3) For up to n failed transmissions, a participating list of up to n nodes that were not on probation for at least one round of the failed transmission;
4) A list of eliminated nodes and of probation nodes and the transmission attempt for which they were placed on probation;
5) The same as items 1)-3) of an intermediate node's Signature buffer; and
6) The same as item 3) of an intermediate node's data buffer.
7) The number of blocked rounds (rounds when the sender cannot insert any packets) and the total number of packets inserted by sender for the current transmission.

Broadcast Buffer. Holds up to 2n start of transmission parcels and the labels of up to n−1 nodes that should be removed from probation.

Copy of Current Packets Stack. Maintains a copy of all the packets that are being sent in the current transmission attempt (to be used any time a transmission fails and needs to be repeated).

The receiver's buffers are the same as in the edge-scheduling protocol's Setup, with the addition of a Broadcast buffer, Data buffer, and Signature buffers which are identical to those of an intermediate node.

The rest of the Setup is the same as in the edge-scheduling protocol, with the added assumption that each node receives a private key from a trusted third party for signing, and each node receives public information that allows them to verify the signature of every other node in the network.

VI.B.2 Routing Phase

As in the edge-scheduling protocol, rounds consist of two stages followed by re-shuffling packets locally. The main difference between the two protocols is the addition of signatures to information, as well as the need to transmit the broadcast information, namely the status reports and start and end of transmission broadcasts, which inform the nodes of probation and eliminated nodes and request status reports in the case a transmission fails.

The two stages of a round are divided as they were for the edge-scheduling protocol, with the same treatment of routing codeword packets (with the addition of signatures). However, we will also require that each round allows all edges the opportunity to transmit broadcast information (e.g. status report parcels). Therefore, for every edge and every round of a transmission, there are four main packet transfers, two in each direction: codeword packets, broadcast parcels, and signatures confirming receipt of each of these.

FIG. 8 shows the order of transmission for this example protocol.

At the start of any transmission attempt T, the sender will determine which codeword is to be sent (the next one in the case the previous transmission was successful, or the same one again in the case the previous transmission failed). He will fill his Copy Of Current Packets Stack with a copy of all of the codeword packets (to be used in case the transmission fails), and then fill his outgoing stacks with packets corresponding to this codeword. All codeword packets are signed by the sender, and these signatures will remain with the packets as they travel through the network to the receiver.

Referring to FIG. 8, we provide a brief description of the information that should be passed across edge E(A, B) (B≠S and A≠R, and A, B ∈ G, i.e. not eliminated) during transmission attempt T. The precise and complete description can be found in the pseudo-code of Section IX. As part of this example protocol, if a node ever receives inaccurate or mis-signed information, it will act as if no information was received at all (e.g. as if the edge had failed for that stage).

Stage 1. A will send the same information to B as in the edge-scheduling protocol (height, height of flagged packet, round packet was flagged). Also, if A received a valid broadcast parcel from B in Stage 2 of the previous round, then A will send B confirmation of this fact. Also, if A knows that B has crucial broadcast information A needs, A specifies the type of broadcast information he wants from B. Meanwhile, A should receive the seven items that B signed and sent (see below), updating his intermediate variables as in the edge-scheduling protocol and updating its signature buffer, provided B has given a valid signature. Here, "valid" means that A agrees with all the values sent by B, and B's signature is verified.

At the other end, B will send the following seven items to A:
1) the transmission index;
2) index of the current round;
3) current height;
4) index of the round B last received a packet from A;
5) the net change in packet transfers so far across E(A, B) for the current transmission attempt;
6) B's cumulative increase in potential due to packet transfers across E(A, B) in the current transmission attempt; and
7) if a packet p was sent and received in Stage 2, the net number of times p has been transferred across E(A, B) for the current transmission.

Meanwhile, B will also receive the information A sent.

Stage 2. A will send a packet to B under the same conditions as in the edge-scheduling protocol, with the following additional conditions:
1) A has received the sender's start of transmission broadcast (see below), and this information has passed across E(A, B) or E(B, A);
2) A and B are not on (A's version of) the probation list;
3) A does not have any end of transmission information not yet passed across E(A, B) or E(B, A); and
4) A does not have any changes to probation list information yet to pass across E(A, B) or E(B, A).

We emphasize these last two points. If A (including A=S) has any start of transmission, end of transmission, or changes to probation list information in its broadcast buffer that it has not yet passed along edge E(A, B), then it will not send a packet along this edge.

If A does send a packet, the "packet" A sends includes a signature on the following seven items:
1) transmission index;
2) index of the current round;
3) the packet itself with sender's signature;
4) index of the round A first tried to send this packet to B;
5) One plus the net change in packet transfers so far across E(A, B) for the current transmission;
6) A's cumulative decrease in potential due to packet transfers across E(A, B) in the current transmission attempt, including the potential drop due to the current packet being transferred; and
7) One plus the net number of times the packet currently being transferred has been transferred across E(A, B) for the current transmission.

Also, A should receive broadcast information (if B has something in its broadcast buffer not yet passed along E(A, B)) and update its broadcast buffer as described by the Update Broadcast Buffer Rules below. Recall that packets have room to hold two signatures. The first will be the sender's signature that accompanies the packet until the packet is removed by the receiver. The second signature is the one indicated here, and this signature will be replaced/overwritten by the sending node every time the packet is passed across an edge.

At the other end, B will receive and store the packet sent by A as in the edge-scheduling protocol, updating his signature buffer appropriately, with the added conditions:
1) B has received the sender's start of transmission broadcast, and this information has been passed across E(A, B) or E(B, A);
2) The packet has a valid signature from S;
3) A and B are not on (B's version of) the probation list;
4) B does not have any end of transmission information not yet passed across E(A, B) or E(B, A);
5) B does not have any changes to probation list information yet to pass across E(A, B) or E(B, A); and
6) The signatures on the seven items included with the packet from A is "valid."

Additionally, if there is anything in B's broadcast buffer that has not been transferred along E(A, B) yet, then B will send one parcel of broadcast information chosen according to the priorities:
1) The receiver's end of transmission parcel;
2) One of the sender's start of transmission parcels;
3) Changes to the probation list or a node to permanently eliminate;
4) The identity of a node N on B's probation list for which B has complete knowledge of N's status report;
5) The most recent status report parcel A requested in Stage 1 of an earlier round; and
6) Arbitrary status report parcels.

For any edge E(A, S) or E(R, B), only broadcast information is passed along these directed edges, and this is done as in the rules above, with the exceptions mentioned below in the Update Broadcast Buffer Rules for S and R. Additionally, any round in which the sender is unable to insert any packets, he will increase the number of blocked rounds in his data buffer. The sender will also keep track of the total number of packets inserted in the current transmission in his data buffer.

VI.B.3 Re-Shuffle Rules

The Re-Shuffle rules are the same as in the edge-scheduling protocol, with the exception that node's record the changes in potential caused by re-shuffling packets locally.

VI.B.4 Update Broadcast Buffer Rules

For Intermediate Nodes. Looking at Stage 2 of the Routing Rules above, we have that in every round and for every edge E(A, B), each node B will have the opportunity to send and receive exactly one parcel of broadcast information in addition to a single codeword packet. The order in which a node's broadcast buffer information is transmitted is described above in the Routing Rules.

For any node $A \in P/\{R, S\}$, we now describe the rules for updating their broadcast buffer when they receive broadcast information. Assume that A has received broadcast information along one of its edges E(A, B), and has verified that it has a valid signature. We describe how A will update its broadcast buffer, depending on the nature of the new information.

Case: The received information is the receiver's end of transmission broadcast (see below). In this case, A will first make sure the transmission index is for the current transmission attempt, and if so, the information is added to A's broadcast buffer, and edge E(A, B) is marked as having already transmitted this information.

Case: The received information is the sender's start of transmission broadcast (see below). This broadcast consists of a single parcel containing information about the previous transmission, followed by up to 2n−2 additional parcels (describing probation listed/eliminated nodes and labels of up to n previous transmissions that have failed). When A receives a parcel from the start of transmission broadcast, if A does not already have it stored in its broadcast buffer, it will add it, and edge E(A, B) is marked as having already transmitted this information. Additionally, A will handle the parcels concerning probation nodes as described below. Finally, when A has received every parcel in the start of transmission broadcast, it will also remove from its probation list any node not implicated in this broadcast (i.e. this will count as "A receives information concerning a node to remove from the probation list," see below), as well as clearing its signature buffers for the new transmission.

Case: The received information indicates a node N to eliminate. If the information is current, then A will add the new information to its broadcast buffer and mark edge E(A, B) as already having passed this information. If N is not already on A's list of eliminated nodes EN, then A will add N to EN (in its data buffer), clear all of its incoming and outgoing stacks, its signature buffers, and its broadcast buffer (with the exception of start of transmission parcels).

Case: The received information concerns a node N to add to or remove from the probation list. If the received information did not originate in the current transmission (as signed by the sender) or A has more recent probation list information regarding N, then A ignores the new information. Otherwise, the information is added to A's broadcast buffer, and edge E(A, B) is marked as having already transmitted this information. Additionally, parcels that are now outdated in A's broadcast buffer are deleted (such as N's status report parcels or a parcel indicating a node $\hat{N}$ had N's complete status report).

If N=A, then A adds n of its own status report parcels to its broadcast buffer, choosing these n parcels based on information from the relevant start and end of transmission parcels. A also will add his own signature to each of these parcels, so that they each one will carry two signatures back to the sender (A's signature and the relevant neighbor's signature).

Case: The received information indicates B has some node N's complete status report. If N is on A's probation list for the transmission B claims knowledge for, then A stores the fact that B has complete knowledge of N in its data buffer. A may later use this information when requesting a specific parcel from B.

Case: The received information pertains to some node N's status report the sender has requested. A will first make sure that N is on its version of the probation list. If so, the information is added to A's broadcast buffer, and edge E(A, B) is marked as having already transmitted this information. If this completes A's knowledge of N's status report, A will add to its broadcast buffer the fact that it now knows all of N's missing status report.

At the end of a transmission, all nodes will clear their broadcast buffers except parcels concerning a probation node's status report. All nodes also clear their version of the probation list (it is restored at the beginning of the next transmission attempt).

For Receiver. The receiver has the same rules as intermediate nodes for updating its broadcast buffer, with the addition that when there are exactly n rounds left in any transmission attempt, R will add to its broadcast buffer a single (signed) parcel that indicates the transmission index, whether or not he could decode the current codeword, and the label of a duplicate packet he received (if there was one). We will refer to this as the receiver's end of transmission parcel.

We note that because there is always an active honest path between sender and receiver, and the receiver's final broadcast has top priority in terms of broadcast order, the sender will necessarily receive this broadcast by the end of the transmission attempt. Alternatively, we could modify our protocol to add an extra n rounds to allow this broadcast to reach the sender. However, the exposition is easier without adding an extra n rounds, and we will show that wasting the final n rounds of a transmission by having the receiver determine if it can decode with n rounds still left is not important, as the n wasted rounds is insignificant compared to the $O(n^3)$ rounds per transmission.

For Sender. The rules for the sender updating its broadcast buffer are slightly more involved, as the sender is the one determining which information it requires of each node, as well as managing the probation listed and eliminated nodes. The below rules dictate how S will update his broadcast buffer and status buffer at the end of a transmission, or when the sender receives new (appropriately signed) broadcast information along E(A, S).

Case: A transmission attempt T has just ended. Note that the sender will have necessarily received and stored the receiver's end of transmission broadcast by the end of the transmission.

In the case that the transmission was successful, S will clear his outgoing stacks and Copy of Old Packets Stack, then re-fill them with codewords corresponding to the next message. If EN denotes the eliminated nodes and $B_T$ denotes the nodes on the sender's probation list at the end of this transmission attempt, then the sender will set $\Omega_{T+1}=(|EN|, |B_T|, F, 0)$, where F denotes the number of failed transmissions that have taken place since the last corrupt node was eliminated. Finally, the sender will delete the information in his data buffer concerning the number of packets inserted and the number of blocked rounds for the just completed transmission attempt.

In the case that the transmission failed, S will clear his outgoing stacks and then re-fill them using the Copy of Old Packets Stack, while leaving the latter stack unchanged. The sender will determine the reason the transmission failed (F2-

F4), and add this fact along with the relevant information from his own signature buffers to the data buffer. For any node (not including S or R or eliminated nodes) not on the sender's probation list, the sender will add the node to the participating list $P_T$ in his data buffer, and then add each of these nodes to the probation list, recording that T was the most recent transmission that the node was probation listed. Also, the sender will set:

$$\Omega_{T+1} = \begin{cases} (|EN|, |B_T|, F, p) & \text{if the transmission failed and} \\ & p \text{ was included in the reciever's} \\ & \text{end of transmission parcel} \\ (|EN|, |B_T|, F, p) & \text{if the transaction failed and } S \\ & \text{inserted } D \text{ packets} \\ (|EN|, |B_T|, F, p) & \text{otherwise} \end{cases} \quad (3)$$

For both a failed transmission and a successful transmission, the sender will sign and add to his broadcast buffer the following parcels, which will comprise the sender's Start of Transmission (SOT) broadcast: $\Omega_{T+1}$, a list of eliminated and probation nodes, and the reason for failure of each of the last (up to n−1) failed transmissions since the last node was eliminated. Note that each parcel added to the broadcast buffer regarding a probation node includes the index of the transmission for which the node was probation listed, and all parcels added to the broadcast buffer include the index of the transmission about to start (as a timestamp) and are signed by S. Notice that the rules regarding priority of transferring broadcast information guarantee that $\Omega_{T+1}$ is the first parcel of the SOT that is received, and because it reveals the number of probation listed and eliminated nodes and the number of failed transmissions to expect, as soon as each node receives $\Omega_{T+1}$, they will know exactly how many more parcels remain in the SOT broadcast. Nodes will not be allowed to transfer any (codeword) packets until the SOT broadcast for the current transmission is received in its entirety.

Case: The sender receives the receiver's end of transmission parcel for the current transmission. The sender will store this parcel in its data buffer.

Case: The sender receives information along E(B, S) indicating B has some node N's complete status report. If N is on the sender's probation list for the transmission B claims knowledge for, then the sender stores the fact that B has complete knowledge of N in its data buffer. The sender will later use this information when requesting a specific parcel from B.

Case: The sender receives information along E(B, S) that pertains to some node N's status report that the sender has requested. The sender will first make sure that N is on its probation list and that the parcel received contains the appropriate information, i.e. the sender checks its data buffer to see which transmission N was added to the probation list and the reason this transmission failed, and makes sure the status report parcel is from this transmission and contains the information corresponding to this reason for failure. If the parcel has faulty information that has been signed by N, i.e. N sent back information that was not requested by the sender, then N is eliminated from the network. Otherwise, the sender will add the information to its data buffer. If the information completes N's missing status report, the sender updates his broadcast buffer indicating N's removal from the probation list, including the index of the current transmission and his signature.

The sender will then determine if he has enough information to eliminate a corrupt node N'. If so, N' is added to his list of Eliminate Nodes, and his broadcast buffer and data buffer is wiped completely (except for the list of eliminated nodes). Also, he will abandon the current transmission attempt and begin a new one corresponding to the same codeword. In particular, he will clear his outgoing stacks and re-fill them with the codewords in his Copy of Old Packets Stack, leaving the latter unchanged, and he will skip to the "A transmission has just ended" case above, setting the start of transmission parcel $\Omega_{T+1} = (|EN|, 0, 0, 0)$.

VI.C Performance of the Node-Controlling+Edge-Scheduling Adversarial Protocol

We state our results concerning the correctness, throughput, and memory of this example protocol. These results can be proven, but for brevity, the proofs are omitted in this description.

Throughput. Except for the at most $n^2$ transmissions that may fail due to malicious activity, this particular protocol enjoys linear throughput. More precisely, after x transmission attempts, the receiver has correctly outputted at least $x-n^2$ messages. If the number of transmission attempts x is quadratic in n or greater, then the failed transmissions due to adversarial behavior become asymptotically negligible. Since a transmission attempt lasts $O(n^3)$ rounds and messages contain $O(n^3)$ bits, information is transferred through the network at a linear rate.

Correctness. The throughput result also implicitly states that this example protocol is correct.

Node Memory. The memory required of each node is at most $O(n^4(k+\log n))$.

VII. Additional Remarks

Although the detailed description contains many specifics, these should not be construed as limiting the scope of the invention but merely as illustrating different examples and aspects of the invention. It should be appreciated that the scope of the invention includes other embodiments not discussed in detail above.

Various other modifications, changes and variations which are apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims. In addition, although the examples show various aspects of the invention used in combination, these aspects are not required to always be used in combination or in the combinations shown.

In alternate embodiments, the invention is implemented in computer hardware, firmware, software, and/or combinations thereof. Apparatus of the invention can be implemented in a computer program product tangibly and non-transitorily embodied in a machine-readable storage device for execution by a programmable node; and method steps of the invention can be performed by a programmable node executing a program of instructions to perform functions of the invention by operating on input data and generating output. The invention can be implemented advantageously in one or more computer programs that are executable on a programmable system including at least one programmable node coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable nodes include, by way of example, both general and special purpose microprocessors. Generally, a node will receive instructions and data from a read-only memory and/or a random access memory. Generally, a computer will include one or more mass storage devices for storing data files; such devices include magnetic disks, such as intermediate hard disks and removable disks; magneto-optical disks; and optical disks. Storage devices suitable for tangibly and non-transitorily embodying computer program instructions and data include all forms of non-volatile memory, including by way of example semiconductor memory devices, such as EPROM, EEPROM, and flash memory devices; magnetic disks such as intermediate hard disks and removable disks; magneto-optical disks; and CD-ROM disks. Any of the foregoing can be supplemented by, or incorporated in, ASICs (application-specific integrated circuits) and other forms of hardware.

The terms "node" and "module" are not meant to be limited to a specific physical form. Depending on the specific application, nodes and modules can be implemented as hardware, firmware, software, and/or combinations of these. Furthermore, different nodes and modules can share common components or even be implemented by the same components.

Depending on the form of the nodes and modules, the "coupling" between nodes and modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

VIII. Pseudo Code for the Example Edge-Scheduling Adversarial Protocol

VIII.A Intermediate Nodes' Setup

```
Setup
    DEFINITION OF VARIABLES
01  n := Number of nodes in G;

02  D := 6n³/λ;

03  T := Transmission index;
04  t := Stage/Round index;
05  P := Capacity of edge (in bits);
06  for every N ∈ G
07      for every outgoing edge E(N, B) ∈ G, B ≠ S and N ≠ R
08          OUT ∈ [2n] × {0, 1}ᴾ;    ## Stack_OUT E(N,B), outgoing stack with capacity 2n
09          p̃ ∈ {0, 1}ᴾ ∪ ⊥;          ## Copy of packet to be sent
10          sb ∈ {0, 1};              ## Status bit
11          d ∈ {0, 1};               ## Bit indicating if packet was sent in prev round
12          FR ∈ [0..6D] ∪ ⊥;         ## Flagged Round (round N first tried to send p̃ to B)
13          H ∈ [0..2n];              ## Height of Stack_OUT E(N,B). Also denoted H_OUT.
14          H_FP ∈ [1..2n] ∪ ⊥;       ## Height of Flagged Packet
15          RR ∈ [-1..6D] ∪ ⊥;        ## Round Received (from adjacent incoming stack)
16          H_IN ∈ [0..2n] ∪ ⊥;       ## Height of Stack_IN E(N,B)
17      for every incoming edge E(A, N) ∈ G, A ≠ R and N ≠ S
18          IN ∈ [2n] × {0, 1}ᴾ;      ## Stack_IN E(A,N), incoming stack with capacity 2n
19          p ∈ {0, 1}ᴾ ∪ ⊥;          ## Packet just received
20          sb ∈ {0, 1};              ## Status bit
21          RR ∈ [-1..6D];            ## Round Received (round N last rec'd packet from A)
22          H ∈ [0..2n];              ## Height of Stack_IN E(A,N). Also denoted H_IN.
23          H_GP ∈ [1..2n] ∪ ⊥;       ## Height of Ghost Packet
24          H_OUT ∈ [0..2n] ∪ ⊥;      ## Height of Stack_OUT E(A,N) or of Flagged Packet of A
25          sb_OUT ∈ [0,1];           ## Status Bit of Stack_OUT E(A,N)
26          FR ∈ [0..6D] ∪ ⊥;         ## Flagged Round index (from adjacent outgoing stack)
    INITIALIZATION OF VARIABLES
27  for every N ∈ G
28      for every incoming edge E(A, N) ∈ G, A ≠ R and N ≠ S
29          Initialize IN;            ## Set each entry in IN to ⊥
30          p, FR, H_GP = ⊥;
31          sb, sb_OUT, H, H_OUT = 0; RR = -1;
32      for every outgoing edge E(N, B) ∈ G, B ≠ S and N ≠ R
33          Initialize OUT;           ## Set each entry in OUT to ⊥
34          p̃, H_FP, RR, FR = ⊥;
35          sb, d, H, H_IN = 0;
End Setup
```

VIII.B Sender and Receiver's Additional Setup

Sender and Receiver's Additional Setup
   DEFINITION OF ADDITIONAL VARIABLES FOR SENDER
36 $M := \{m_1, m_2, ...\}$ = Input Stream of Messages;
37 $\kappa \in [0..D]$ = Number of packets corresponding to current
   codeword the sender has knowingly inserted;
   INITIALIZATION OF SENDER'S VARIABLES:
38 Distribute Packets;   ## See Section VIII.D
39 $\kappa = 0$;
   DEFINITION OF ADDITIONAL VARIABLES FOR RECEIVER:
40 $I_R \in [D] \times (\{0,1\}^P) \cup \bot$ = Storage
   Stack to hold packets corresponding to current codeword;
41 $\kappa \in [0..D]$ := Number of packets received corresponding to
current codeword;
   INITIALIZATION OF RECEIVER'S VARIABLES:
42 $\kappa = 0$;
43 Initialize $I_R$;   ## Sets each element of $I_R$ to $\bot$
End Sender and Receiver's Additional Setup

VIII.C Routing Rules

Transmission T
01 for every $N \in G$   ## Transmission attempt
02   for every $t < 2 * (3D)$   ## The factor of 2 is for the
                                 2 stages per round
03     if t (mod 2) = 0 then:   ## STAGE 1
04       for every outgoing edge $E(N, B) \in G$, $N \neq R$ and $B \neq S$
05         if $H_{FP} = \bot$: send $(H, \bot, \bot)$; else: send $(H - 1, H_{FP}, FR)$;
06       receive $(H_{IN}, RR)$;
07       Reset Outgoing Variables;
08       for every incoming edge $E(A, N) \in G$, $N \neq S$ and $A \neq R$
09         send (H, RR);
10         $sb_{OUT} = 0$; $FR = \bot$;
11         receive $(H, \bot, \bot)$ or $(H, H_{FP}, FR)$   ## If $H = \bot$ or $FR > RR$,
                                                          set $H_{OUT} = H_{FP}$;
                                                          ## $sb_{OUT} = 1$ else
                                                          set $H_{OUT} = H$; $sb_{OUT} = 0$
12     else if t (mod 2) = 1 then:   ## STAGE 2
13       for every outgoing edge $E(N, B) \in G$, $N \neq R$, and $B \neq S$
14         if $H_{IN} \neq \bot$ then:   ## Received B's info.
15           Create Flagged Packet;
16           if (sb=1 or (sb=0 and $H_{OUT} > H_{IN}$)) then:
17             Send Packet;
18         for every incoming edge $E(A, N) \in G$, $N \neq S$ and $A \neq R$
19           Receive Packet;
20           if $N \in \{S, R\}$ then: Re-Shuffle;
21           else if N = R then: Receiver Re-Shuffle;
22           else if N = S then: Sender Re-Shuffle;
23     if t = 2(3D) − 1 then: End of Transmission Adjustments
End Transmission T

VIII.D Routing Rules (Cont.)

24 Reset Outgoing Variables
25 if d = 1;   ## N sent a packet previous round
26   d = 0;
27   if $RR = \bot$ or $\bot \neq FR > RR$   ## Didn't receive conf. of packet receipt
28     sb = 1;
29 if $RR \neq \bot$;
30   if $\bot \neq FR \leq RR$;   ## B rec'd most recently sent packet;
31     if N = S then: $\kappa = \kappa + 1$;
32     $OUT[H_{FP}] = \bot$; Fill Gap;   ## Remove $\bar{p}$ from OUT, shifting down packets on
                                         ## top of $\bar{p}$ if necessary
33     FR, $\tilde{p}$, $H_{FP} = \bot$; sb = 0; H = H − 1;
34 if $\bot \neq RR < FR$ and $\bot \neq H_{FP} < H$;   ## B did not receive most recently sent packet
35   Elevate Flagged Packet;   ## Swap OUT[H] and OUT $[H_{FP}]$; Set $H_{FP} = H$;
36 Create Flagged Packet
37 if sb = 0 and $H > H_{IN}$;   ## Normal Status, will send top packet
38   $\tilde{p}$ = OUT[H]; $H_{FP} = H$; FR = t;
39 Send Packet
40 d = 1;
41 send ($\tilde{p}$, FR);
42 Receive Packet
43 receive (p, FR);
44 if $= H_{OUT} = \bot$;   ## Didn't rec. A's height info.
45   sb = 1;
46   if $H_{GP} > H$ or ($H_{GP} = \bot$ and H < 2n);   $H_{GP} = H + 1$;
47 else if $sb_{OUT} = 1$ or $H_{OUT} > H$;   ## A packet should've been sent
48   if p = $\bot$;   ## Packet wasn't rec'd
49     sb = 1;
50     if $H_{GP} > H$ or ($H_{GP} = \bot$ and H < 2n);   $H_{GP} = H + 1$;
51   else if RR < FR;   ## Packet was rec'd and should keep it
52     if $H_{GP} = \bot$; $H_{GP} = H + 1$;   ## If no slot is saved for p, put it on top
53     sb = 0; $IN[H_{GP}] = p$; H = H + 1; $H_{GP} = \bot$; RR = t;
54   else   ## Packet was rec'd, but already had it
55     sb = 0; Fill Gap; $H_{GP} = \bot$;   ## See comment about Fill Gap on line 57 below
56 else:   ## A packet should NOT have been sent
57   sb = 0; Fill Gap; $H_{GP} = \bot$;   ## If packets occupied slots above Ghost Packet,
                                           ## Fill Gap will Slide those packets down one slot
58 End of Transmission Adjustment
59 for every outgoing edge $E(N, B) \in G$, $N \neq R$ and $B \neq S$;
60   if $H_{FP} \neq \bot$;
61     $OUT[H_{FP}] = \bot$; Fill Gap;   ## Remove any flagged packet $\bar{p}$ from OUT
                                          ## shift down packets on top of $\bar{p}$ if necessary
62     d, sb = 0; FR, $H_{FP}$, $\tilde{p} = \bot$; H = H − 1;
63 for every incoming edge $E(A, N) \in G$, $N \neq S$ and $A \neq R$
64   $H_{GP} = \bot$; sb = 0; RR = −1; Fill Gap;
65 if N = S   then: Distribute Packets;

VIII.E Re-Shuffle Rules

```
71  Re-Shuffle
72  (M, B_F) = Find Maximum Stack          ## Node N finds its fullest stack B_F with height M,
                                           ## break ties by 1) selecting incoming stacks over
                                           ## outgoing stacks, then 2) Round-Robin
73  (m, B_T) = Find Minimum Stack          ## Node N finds its emptiest stack B_T with height m,
                                           ## break ties by 1) selecting outgoing stacks over
                                           ## incoming stacks, then 2) Round-Robin
74  if Packet Should Be Re-Shuffled;       ## A packet should be re-shuffled if M − m > 1 or
                                           ## M − m = 1 and  { B^F is an Inc. Buffer
                                                              { B_T is an Out. Buffer }
75     Adjust Heights                      ## Adjust M, m to account for Ghost, Flagged
packets
76     SIG_{N,N} = SIG_{N,N} + (M − m − 1);  ## Only used for (node-contr. + edge=sched.)
protocol
77     Shuffle Packet
78  Re-Shuffle
79  Adjust Heights
80  if B_F is an Out. Stack and H_{FP} ≥ H_{OUT};   ## H_{FP} and H_{OUT} refer to B_F's info. If true,
81     M = M − 1;                          ## Flagged packet is top-most non-null packet
82  if B_F is an Inc. Stack and IN[H_{IN} + 1] ≠ ⊥;  ## IN and H_{IN} refer to B_F's info. If true,
83     M = M + 1;                          ## then there is a Ghost Packet creating a gap
84  if B_T is an Out. Stack and OUT[H_{OUT}] = ⊥;   ## OUT and H_{OUT} refer to B_T's info. If true,
85     m = m − 1;                          ## then there is a Flagged packet creating a gap
86  if B_T is an Inc. Stack and H_{GP} ≠ ⊥;  ## H_{GP} and H_{IN} refer to B_T's info. If true,
87     m = m + 1;                          ## then there is a Ghost Packet creating a gap
88  Shuffle Packet
89  B_T[m + 1] = B_F[M];
90  B_F[M] = ⊥;
91  H_{BT} = H_{BT} + 1;                   ## H_{BT} is the height of B_T
92  H_{BF} = H_{BF} − 1;                   ## H_{BF} is the height of B_F
93  if B_F is an Inc. Stack and ⊥ ≠ H_{GP} > H_{IN}; then:## H_{GP} and H_{IN} refer to B_F's info.
94     H_{GP} = H_{IN} + 1;                ## Since B_F lost a packet, slide Ghost Packet down
                                           ## into top slot
95  Sender Re-Shuffle
96  Fill Packets;                          ## Fill each outgoing stack with codeword packets
                                           ## not yet distributed, adjust each H_{OUT}
97  Receiver Re-Shuffle
98  for every incoming edge E(A, R) ∈ G;   ## Reset R's Inc. Stack to be open
99     if H_{IN} > 0;                      ## R rec'd a packet along this edge this round
100       if IN[1] is a packet for current codeword;  ## Also, see comments on 104 below
101          I_R[κ] = IN[1]; κ = κ + 1;
102       H_{IN} = 0; IN[1] = ⊥; H_{GP} = ⊥;
103 if κ ≥ D − 3n^3 then:                  ## R can decode
104    Decode and output message;          ## Also, only keep codeword packets corresponding
                                           ## to next message in future rounds
```

IX. Pseudo Code for the Example Node-Controlling+Edge-Scheduling Adversarial Protocol In the following pseudo-code, differences from the edge-scheduling protocol of Section VIII are marked by the line number in bold.

IX.A Intermediate Nodes' Setup

```
Setup
    DEFINITION OF VARIABLES:
01  n := Number of nodes in G;

02  D := 3n^3 / λ;

03  T := Transmission index;
04  t := Stage/Round index;
05  k := Security Parameter;
06  P := Capacity of edge= O(k + log n);
07  for every N ∈ P \ S
08     BB ∈ [n^2 + 5n] × {0, 1}^{P+n};     ## Broadcast buffer
09     DB ∈ [1..n^2] × {0, 1}^P;           ## Data buffer. Holds BL, EN, and info. as on line 151
10       BL ∈ [1..n − 1] × {0,1}^P;        ## Probation list
11       EN ∈ [1..n − 1] × {0,1}^P;        ## List of Eliminated Nodes
12     SIG_{N,N} ∈ {0, 1}^{O(log n)};      ## Change in potential due to re-shuffling of packets
13  for every N ∈ G
14     SK, {PK}_i^n                       ## Secret Key for signing, Public Keys to verify sig's
15       for every outgoing edge E(N, B) ∈ G, B ≠ S and N ≠ R
```

-continued

| | | |
|---|---|---|
| 16 | $OUT \in [2n] \times \{0,1\}^P$; | ## Outgoing Stack able to hold 2n packets |
| 17 | $SIG_{N,B} \in [D+3] \times \{0,1\}^{O(\log n)}$; | ## Signature buffer for current trans., as follows: |
| | ## $SIG[1]$= net no. of current codeword p's transferred across $E(N, B)$ | |
| | ## $SIG[2]$= net change in B's pot. due to p. transfers across $E(N, B)$ | |
| | ## $SIG[3]$= net change in N's pot. due to p. transfers across $E(N, B)$ | |
| | ## $SIG[p]$= net no. of times packet p transferred across $E(N, B)$ | |
| 18 | $\tilde{p} \in \{0,1\}^P \cup \perp$; | ## Copy of packet to be sent |
| 19 | $sb \in \{0,1\}$; | ## Status bit |
| 20 | $d \in \{0,1\}$; | ## Bit indicating if a packet was sent in prev. round |
| 21 | $FR \in [0..8D] \cup \perp$ | ## Flagged Round (round N first tried to send $\tilde{p}$ to B) |
| 22 | $RR \in [-1..8D] \cup \perp$ | ## Round Received (from adjacent incoming stack) |
| 23 | $H \in [0..2n]$; | ## Height of OUT. Also denoted $H_{OUT}$. |
| 24 | $H_{FP} \in [1..2n] \cup \perp$; | ## Height of Flagged Packet |
| 25 | $H_{IN} \in [1..2n] \cup \perp$; | ## Height of incoming stack of B |
| 26 | for every outgoing edge $E(N, B) \in G$, including $B = S$ and $N = R$ | |
| 27 | $bp \in \{0,1\}^P$; | ## Broadcast Parcel received along this edge |
| 28 | $\alpha \in \{0,1\}^P$; | ## Broadcast Parcel request |
| 29 | $c_{bp} \in \{0,1\}$; | ## Verification bit of broadcast parcel receipt |
| 30 | for every outgoing edge $E(A, N) \in G$, $A \neq R$ and $N \neq S$ | |
| 31 | $IN \in [2n] \times \{0,1\}^P$; | ## Incoming Stack able to hold 2n packets |
| 32 | $SIG_{A,N} \in [D+3] \times \{0,1\}^{O(\log n)}$; | ## Signature buffer, indexed as on line 17 |
| 33 | $p \in \{0,1\}^P \cup \perp$; | ## Packet just received |
| 34 | $sb \in \{0,1\}$; | ## Status bit |
| 35 | $RR \in \{0,1\}^{8D}$; | ## Round Received index |
| 36 | $H \in [0..2n]$; | ## Height of IN. Also denoted $H_{IN}$. |
| 37 | $H_{GP} \in [1..2n] \cup \perp$; | ## Height of Ghost Packet |
| 38 | $H_{OUT} \in [0..2n] \cup \perp$; | ## Height of outgoing stack or of Flagged Packet of A |
| 39 | $sb_{OUT} \in \{0,1\}$; | ## Status Bit of outgoing stack of A |
| 40 | $FR \in \{0,1\}^{8D} \cup \perp$; | ## Flagged Round index (from adjacent outgoing stack) |
| 41 | for every outgoing edge $E(A, N) \in G$, including $A = R$ and $N = S$ | |
| 42 | $bp \in \{0,1\}^P$; | ## Broadcast Parcel to send along this edge |
| 43 | $c_{bp} \in \{0,1\}$; | ## Verification bit of packet broadcast parcel receipt |

IX.B Sender and Receiver's Additional Setup

Sender and Receiver's Additional Setup
INITIALIZATION OF VARIABLES:
44 for every $N \in G$
45   Receive Keys;          ## Receive $\{PK\}_i^n$ and SK from KEYGEN
46   Initialize BB, DB, BL, EN, $SIG_{N,N}$; ## Set $SIG_{N,N} = 0$, set each entry of DB and BB to $\perp$
47   for every incoming edge $E(A, N) \in G$, $A \neq R$ and $N \neq S$
48     Initialize IN, SIG;    ## Set each entry in IN to $\perp$ and each entry of SIG to 0
49     $p, H_{GP}, FR = \perp$ ;
50     $sb, sb_{OUT}, c_p, H, H_{OUT} = 0$; $RR = -1$;
51   for every incoming edge $E(A, N) \in G$, including $A = R$ and $N = S$
52     $b_p = \perp$ ; $c_{bp} = 0'$
53   for every outgoing edge $E(N, B) \in G$, $B \neq S$ and $N \neq R$
54     Initialize OUT, SIG;   ## Set each entry in OUT to $\perp$ and each entry of SIG to 0
54     $\tilde{p}$ $H_{FP}, FR, RR = \perp$ ;
55     $sb, d, H, H_{IN}, 0$;
57   for every outgoing edge $E(N, B) \in G$, including $B = S$ and $N = R$
58     $bp, \alpha = \perp$ ; $c_{bp} = 0$;
Sender's Additional Setup
   DEFINITION OF ADDITIONAL VARIABLES FOR SENDER:
59 $M := \{m_1, m_2,...\}$ = Input Stream of Messages;
60 $COPY \in [D] \times \{0,1\}^P$ := Copy of Packets for Current Codeword;
61 $BB \in [3n] \times \{0,1\}^P$ := Broadcast buffer;
62 $DB \in [1..n^3 + n^2 + n] \times \{0,1\}^P$ := Data buffer, which includes:
63   $BL \in [1..n] \times \{0,1\}^P$ := Probation list;
64   $EN \in [1..n] \times \{0,1\}^P$ := List of Eliminated Nodes;
65 $\kappa \in [0..D]$ := Number of packets corresponding to current codeword the sender has knowingly inserted;
66 $\Omega_T \in \{0,1\}^{O(\log n)}$ := First parcel of Start of Transmission broadcast for transmission T;
67 $\beta_T \in [0..4D]$ := Number of rounds blocked in current transmission;
68 $F \in [0..n-1]$ := Number of failed transmissions since the last corrupt node was eliminated;
69 $P_T \in \{0,1\}^n$ := Participating List for current transmission;
   INITIALIZATION OF SENDER'S VARIABLES:
70 $\kappa = 0$;
71 $\beta_1, F = 0$;
72 $\Omega_1 = (0, 0, 0, 0)$;
73 Initialize BB, DB, $P_1$;    ## Set DB to $\perp$, add $\Omega_1$ to BB, and set $P_1 = G$
74 Distribute Packets;
Receiver's Additional Setup -continued DEFINITION OF ADDITIONAL VARIABLES FOR RECEIVER:
75 $I_R \in [D] \times ([0, 1]^P \cup \perp)$ := Storage Stack to hold packets corresponding to current codeword;
76 $\kappa \in [0..D]$ := Number of packets received corresponding to current codeword;
77 $\Theta_T \in \{0, 1\}^{O(k+\log n)}$ := End of Transmission broadcast for transmission T;
INITIALIZATION OF RECEIVER'S VARIABLES:
78 $\kappa = 0$;
79 $\Theta_1 = \perp$;
80 for every outgoing edge $E(R, B) \in G$:
81    bp, $\alpha = \perp$;
82 Initialize $I_R$;
End Setup

IX.C Routing Rules

```
Transmission T                       40 ## Transmission attempt
01 for every N ∈ G, N ∉ EN:
02    For every t < 2* (4D)          ## The factor of 2 is for the 2 stages per round
03       if t (mod 2) = 0 then:      ## STAGE 1
04          Update Broadcast buffer One;
05          for every outgoing edge E(N, B) ∈ G, N ≠ R, B ≠ S
06             if H_FP ≠ ⊥ : send (H, ⊥, ⊥ ); else: send (H − 1, H_FP, FR);
07             receive Signed(T,t, H_IN, RR, SIG[1], SIG[2], SIG[P]); ## Sig [3], 6th coord
                                                ## sent on line 11, is kept as SIG[2]
08             Verify Signature Two;
09             Reset Outgoing Variables;
10             for every incoming edge E(A,N) ∈ G, N ≠ S, A ≠ R## "p" on line 11 refers to last
                   p. rec'd on E(A,N)
11                send Sign(T, t, H, RR, S IG[1], S I G[3], S IG[p]);    ## If p was from an old
                                ## codeword, send instead: Sign(T, t, H, RR, SIG[1], SIG[3], ⊥ )
12                sb_OUT = 0; FR = ⊥ ;
13                receive (H, ⊥ , ⊥ ) or (H, H_FP, FR); ## If H = ⊥ or FR>RR, set sb_OUT=1;
and
                                ## H_OUT = H_FP; else set H_OUT=H; sb_OUT=0;
14       else if t (mod 2) = 1 then:       ## STAGE 2
15          Send/Receive Broadcast Parcels;
16          for every outgoing edge E(N, B) ∈ G, N ≠ R, B ≠ S
17             if H_IN ≠ ⊥ then:
18                Create Flagged Packet;
19                if sb=1 or (sb=0 and H > H_IN) then:
20                   Send Packet;
21          for every incoming edge E(A, N) ∈ G, N ≠ S, A ≠ R
22             Receive Packet;
23             if N ∉ {S, R} and N has rec'd SOT broadcast for T    then: Re-Shuffle;
24             else if N = R and N has rec'd SOT broadcast for T    then: Receiver Re-Shuffle;
25             else if N = S then:
26                Sender Re-Shuffle;
27                if All (non-⊥) values S received on line 07 had H_IN = 2n then: β_T = β_T + 1;
28             if t = 2(4D − n) and N = R then:   Send End of Transmission Parcel;
29             if t = 2(4D) and N = S then:   Prepare Start of Transmission Broadcast;
30             if t = 2(4D) then:   End of Transmission Adjustments;
End Transmission T
```

```
31 Okay to Send Packet
32 if
     ⎧ N doesnot have(Ω_T, T) in BB                                                         OR
     | N has (Ω_T, T) withΩ_T = (|EN|,|β_T|,F, *), but has not yetrec'd|EN| parcelsas in line200b,  OR
     |   F parcelsas in line200c,or|β_T| parcelsas in line200d
     ⎨ N hasrec'd the completeSOT broadcast,but everyparcelhasn't yetpassedacrossE(N, B)    OR
     | N or B ∈ BL                                                                          OR
     | N has Θ_T ∈ BB, but thishasnot passedacrossE(N, B) yet                                OR
     ⎩ N has BL info.in BB (as on line115,items3 or 4) not yetpassedacrossE(N, B)
33    Return False;
34 else:  Return True;
35 Okay to Receive Packet
36 if
     ⎧ N doesnot have(Ω_T, T) in BB                                                         OR
     | N has (Ω_T, T) withΩ_T = (|EN|,|β_T|,F, *), but has not yetrec'd|EN| parcelsas in line200b,  OR
     |   F parcelsas in line200c,or|β_T| parcelsas in line200d
     ⎨ N hasrec'd the completeSOT broadcast,but everyparcelhasn't yetpassedacrossE(A, N)    OR
     | N or A ∈ BL                                                                          OR
     | N has Θ_T ∈ BB, but thishas not passedacrossE(A, N) yet                               OR
     ⎩ N has BL info.in BB(as on line115,items3 or 4) not yetpassedacrossE(A, N)            OR
```

```
37   Return False;
38 else: Return True;
         IX.D   Routing Rules (cont.)
39 Reset Outgoing Variables
40 c_{bp} = 0;
41 if d = 1;                              ## N sent a packet previous round
42   d = 0;
43   if RR = ⊥ or ⊥ ≠ FR > RR             ## Didn't receive conf. of packet receipt
44     sb = 1;
45 if RR ≠ ⊥:
46   if ⊥ ≠ FR ≤ RR:                      ## B rec'd most recently sent packet
47     if N = S then: κ = κ + 1;
48     For i = 1,2,p: SIG[i] = value rec'd on line 07;
49     SIG[3] = SIG[3] + H_{FP};           ## If N = S, skip this line
50     OUT[H_{FP}] = ⊥ ; Fill Gap;         ## Remove p̃ from OUT, shift down packets on top
                                           ## of p̃ (if necessary) and adjusting SIG_{N,N} accordingly
51     FR, p̃,H_{FP} = ⊥ ; sb = 0; H = H − 1;
52 if ⊥ RR < FR and ⊥ ≠ H_{FP} < H:       ## B did not receive most recently sent packet
53     Elevate Flagged Packet;
54 Create Flagged Packet
55   if sb = 0 and H > H_{IN}:             ## Normal Status, will send top packet
56     p̃ = OUT[H]; H_{FP} = H; FR = t;
57 Send Packet
58 d = 1;
59 if Okay to Send Packet then:            ## If p̃ is from an old codeword, send instead:
60   send Sign(T, t, p̃, FR, SIG[1]+1, SIG[3] + H_{FP}, SIG[p̃]+1);   ## Sign(T, t, p̃, FR,
                                           ## SIG[1], SIG[3] + H_{FP}, ⊥)
61 Receive Packet
62 receive Sign(T, t − 2 ,p, FR, SIG[1], SIG[2], SIG[p]);   ## SIG[3], 6th coord. sent on line
                                           ## 60 is kept as SIG[2]
63 if H_{OUT} = ⊥ or Okay to Receive Packet is false:    ##Didn't rec. A's ht. info, or
                                           ## BB info prevents p. transfer
64   sb =1;
65   if H_{Gp} > H or (HGP = ⊥ and H < 2n):
66     H_{GP} = H + 1;
67 else if sb_{OUT}= 1 or H_{OUT} > H:    ## A packet should've been sent
68   Verify Signature One;
69   if (Verify Signature One returns false or    ## Signature from A was not valid, or
        p = ⊥ or p not properly signed by S) then: ## Packet not rec'd. or not signed by S
70     sb = 1;
71     if H_{GP} > H or (H_{GP} = ⊥ and H < 2n):
72       H_{GP} H + 1;
73   else if RR < FR:                     ## Packet was rec'd and should keep it
74     For i = 1,2,p: SIG[i] = value rec'd on line 62;
75     SIG[3] = SIG[3]+ H_{GP};            ## If N = R, skip this line
76     if H_{GP} = ⊥ : H_{GP} = H +1;      ## If no slot is saved for p, put it on top
77     IN[H_{GP}] p;
78     sb= 0; H = H +1; H_{GP} = ⊥ ; RR= t;
79   else:                                 ## Packet was rec'd, but already had it
80     sb 0; Fill Gap; H_{GP} = ⊥ ;        ## See comment about Fill Gap on line 82 below
81 else:                                   ## A packet should NOT have been sent
82   sb = 0; Fill Gap; H_{GP} = ⊥ ;        ## If packets occupied slots above the Ghost Packet,
                                           ## then Fill Gap will Slide them down one slot,
                                           ## updating SIGN,N to reflect this shift, if
necessary
83 Verify Signature One
84 if Signature is Valid and Values are correct ## Verify values sent on 1. 60 are consistent:
85   Return true;           ## Change in SIG[1] and SIG[p] is '1', change in SIG[2] is
86 else:                    ## at least H_{GP}, (T, t) is correct and p. has sender's sig
87   Return false;
88 Verify Signature Two     ## N verifies values B sent on line 11 are consistent:
89 if Signature is NOT Valid or Values are NOT Correct:  ## Change in SIG[1] and SIG[p]
                                           ## is '1', change in SIG[2]
90   RR, H_{IN} = ⊥ ;                      ## is at most H_{FP}, and T and t are correct
91 Send/Receive Broadcast Parcels
92 for every outgoing edge E(N, B) N ∈ G, including N = R, B = S
93   receive bp;
94   Update Broadcast buffer Two;
95 for every incoming edge E(A, N) ∈ G, including N = S, A = R
96   Determine Broadcast Parcel to Send;
97   send bp;
98 Update Broadcast buffer One
99 for every outgoing edge E(N, B) ∈ G, including N = R, B = S
100  if bp ≠ ⊥ then:
101    send c_{bp};
102  Broadcast Parcel to Request;
103  send α;
104 for every incoming edge E(A,N) ∈ G, including N = S, A = R
105  receive c_{bp}; receive α;
```

-continued 106     if $\alpha \neq \perp$ then: Update Broadcast buffer;    ## Update BB to preferentially send $\alpha$
107     if $c_{bp} = 1$ then: Update Broadcast buffer;    ## Update BB that $_{bp}$ crossed E(A, N)
108     $c_{bp} = 0$
109 Update Broadcast buffer Two
110 if $\perp \neq$ bp has valid sig. and
$\begin{cases} \text{N has received full SOT broadcast for T OR} \\ \text{bp is a valid SOT broadcast parcel rec'd in correct order (see 115 and 200 )} \end{cases}$
      ## Here, a "valid" signature means both B and the from node bp originated from, and
      ## a "valid" SOT parcel means that N has already received all SOT parcels that
      ## should have arrived before bp, as indicated by the ordering of line 115, items 2a-2d
111     $c_{bp} = 1$;
112 if N = S: Sender Update Broadcast buffer;
113 else: Intermediate node and Receiver Update Broadcast buffer;
114 Determine Broadcast Parcel to Send
115 Among all information in BB, choose some bp $\in$ BB that has not passed along E(A,N) by priority:
     1) The receiver's end of transmission parcel $\theta_T$
     2) The sender's start of transmission (SOT) broadcast, in order indicated on line 200:
        a) $(\Omega_T,T)$ b) $(\hat{N} \in EN,T)$ c) $(T',Fi,T)$ d) $(\hat{N} \in BL,T',T)$
     3) $(\hat{N}, O, T)$ = label of a node to remove from the probation list, see line 165
     4) $(N,\hat{N},T')$ = label of a node $\hat{N}$ on BL for which N has the complete status report for (T',) see line 155
     5) A status report parcel requested by A as indicated by $\alpha$ (received on line 105)
     6) An arbitrary status report parcel of a node on N's probation list.
116 Broadcast Parcel to Request
117 $\alpha = \perp$
118 if B is on N's probation list and N is missing a status report from B:
119     Set $\alpha$ to indicate B's label and an index of the parcel N is missing from B;
120 else if DB indicates B has complete status report for node $\hat{N}$ on BL (lines 150-151, 155):
121     if N is missing a status report o node $\hat{N}$:
122       Set $\alpha$ to the label of the node $\hat{N}$ and the index of a status report parcel from $\hat{N}$ that N is missing;
123 Intermediate node and Receiver Update Broadcast buffer
      ## Below, a broadcast parcel bp is "Added" only if it is not already BB. Also, view
      ## BB as being indexed by each bp with n − 1 slots for each parcel to indicate which
      ## edges bp has already traversed. Then when bp is removed from BB, the edge
      ## "markings" are removed as well.
124 if bp = $\theta_T$ is receiver's end of transmission parcel (for current transmission T, see 1. 179):
125     Add bp to BB and mark edge E(N,B) as having passed this info.;
126 else if bp = $(\Omega_T,T)$ is first parcel of sender's start of transmission (SOT) broadcast(1. 200a)
127     Add bp to BB, and mark edge E(N,B) as having passed this information;
128     if $\Omega_T = (*,0,*,*)$ : Clear all entries of SIG, and set $SIG_{N,N} = 0$;
129 else if bp = $(\hat{N},T)$ is from the SOT broadcast indicating a node to eliminate (line 200b):
130     Add bp to BB and mark edge E(N,B) as having passed this info.;
131     if $\hat{N} \notin EN$ :        ## N is just learning $\hat{N}$ is to be eliminated
132       Add $\hat{N}$ to EN;
133       Clear all incoming and outgoing stacks, clear all entries of SIG, and set $SIG_{N,N} = 0$;
134       Clear BB, EXCEPT parcels from current SOT broadcast; Clear DB, EXCEPT EN;
135 else if bp = (T'Fi,T) is from SOT broadcast indicating why a previous trans. failed(1. 200c)
136     Add bp to BB and mark edge E(N,B) as having passed this information;
137 else if bp = $(\hat{N},T',T)$ is from SOT broadcast indicating a node to probation list (line 200d)
138     Add $\hat{N}$ to BL; Add bp to BB and mark edge E(N,B) as having passed this information;
139     Remove outdated info. from BB and DB;
        ## This includes for any trans. T" $\neq$ T' removing from DB all entries of form
        ## $(\hat{B},\hat{N},T")$ , see line 115, item 4; and removing from BB: 1)(N,$\hat{N}$,T") , see line 115
        ## item 4, and 2) Any status report parcel of ($\hat{N}$ for T")
140     if $\hat{N}$ = N has not already added its own status report info. corresponding to T' to BB:
        ## The following reasons for failure come from SOT. See lines 190, 193, and
        ## 196-197. The information added in each case is referred to as the node's status
        ## report for transmission T'
141       if entries of $SIG_{N,N}$ and SIG correspond to a transmission T" $\neq$ T'; Clear SIG and set $SIG_{N,N} = 0$;
142       if T' failed as in F2: For each incoming and outgoing edge, sign and add to BB: (SIG[2],SIG[3],T');
143         Also sign and add $(SIG_{N,N},T')$ to BB (see line 12 of Section IX.A);
144       else if T' failed as in F3: For each incoming and outgoing edge, sign and add (SIG[1],T') to BB;
145       else if T' failed as in F4: For each incomingand outgoing edge, sign and add (SIG[p],f) to BB;
146     if N has received $|BL_{T'}|$ SOT parcels of form $(\hat{N},T',T)$: Clear all entries of SIG and set $SIG_{N,N} = 0$;
147 else if bp= $(\hat{N},O,T)$ is from sender, indicating a node to remove from BL, as on line 165:
148     Remove $\hat{N}$ from BL; Add bp to BB and mark edge E(N, B) as having passed this information;
149     Remove outdated info. from BB and DB as on line 139 above;

-continued 150 else if bp= (B,$\hat{N}$,T') indicates B has probation node $\hat{N}$'s complete status report for trans. T':
151    if ($\hat{N}$,T',T) is on $\hat{N}$'s probation list: Add fact that B has $\hat{N}$'s status report to DB;
152 else if bp is a status report parcel for trans. T' of some node ($\hat{N}$'s ,T',T) on BL, see lines 140-145 and 200d:
153    if bp has valid sig. from $\hat{N}$ and concerns correct info.:
        ## N finds ($\hat{N}$ ,T',T) and (T',$F_i$,T) in BB (from SOT broadcast) and
        ## checks that bp concerns correct info.
154      Add bp to BB, and mark edge E(N,B) as having passed this information;
155      if bp completes N's knowledge of $\hat{N}$'s missing status report for transmission T':
        Add (N,$\hat{N}$,T') to BB;
156 Sender Update Broadcast buffer ## A parcel by is "Added" only if it is not in DB
157 if bb = $\Theta_T$ is receiver's end of transmission parcel (for current transmission T):
158    Add bp to DB;
159 else if bb indicates B has a probation node $\hat{N}$'s complete status report for trans. T':
160    if ($\hat{N}$,T',T) is on S's probation list:       Add (B,$\hat{N}$,T') to DB;
161 else if bp is a status report parcel of a node $\hat{N}$ on the sender's probation list (1. 140-145):
162    Add bp to DB;
163    if bp contains faulty info. but has a valid sig. from $\hat{N}$: Eliminate $\hat{N}$;
        ## S checks DB for reason of failure, makes sure $\hat{N}$ has returned appropriate value
164    if bp completes sender's knowledge of $\hat{N}$'s missing status report from transmission T':
165      Sign ($\hat{N}$,0,T) and add to BB;## Indicates $\hat{N}$ should be removed from probation list
166      Remove outdated info. From DB; Remove ($\hat{N}$,T') from BL;
        ## "Outdated" refers to parcels as on 159-160 whose second entry is $\hat{N}$
167    if bp completes sender's knowledge of all relevant status reports from a transmission:
168      Eliminate $\hat{N}$;         ## S can eliminate a node.
169 Eliminate $\hat{N}$
170 Add ($\hat{N}$,T) to EN;
171 Clear BB, DB (except for EN), and signature buffers;
172 $\beta_T$,F = 0;
173 $P_{T+1}$ = P \ EN;
174 $\Omega_{T+1}$ = (|EN|,0,0,0);
175 Sign and Add $\Omega_{T+1}$ to BB;
176 for every N ∈ EN, Sign and Add (N, T + 1) to BB;
177 Halt until End of Transmission Adjustments is called; ## S does not begin inserting p's
                             ## until next trans., and S ignores all instructions for
                             ## T until line 30
178 Send End of Transmission Parcel
179 Add signed $\ominus_T$ = (b,p', T) to BB    ## b is a bit indicating if R could decode, p' is the
                             ## label of a packet R rec'd twice, or else ⊥
180 Prepare Start of Transmission Broadcast
181 ## Let $\ominus_T$ = (b,p', T) denote Sender's value obtained from Receiver's transmission above
     ## (as stored in DB)
182 if b = 1 then:                   ## R was able to decode
183    Clear each entry of signature buffers holding data corresponding to T;
184    $\Omega_{T+1}$ = (|EN|,|BL|,F,0);
185 else if b = 0 then:             ## R was not abel to decode: a failed transmission
186    F = F + 1;
187    Set $P_T$ = P \ (EN ∪ BL) and add ($P_T$, T) to DB;
188    For each N ∈ $P_T$ \ S: Add (N, T) to BL; ## (N, T) records the trans. N was added to BL
189    Clear outgoing stacks;
190    if p' ≠ ⊥:                 ## R rec'd a duplicate packet
191      Add (p',T) to DB; Add SIG[p'] to DB;    ## Record that reason T failed was F4
192      $Q_{T+1}$ = (|EN|, |BL|, F, p');
193    else if κ < D:             ## S did not insert at least D packets
194      Add (1, T) to DB; Add SIG[2] and SIG[3] to DB; ## Record reason T failed was F2
195      $\Omega_{T+1}$ = (|EN|, |BL|, F, 1);
196    else:
197      Add (2,T) to DB; Add SIG[1] to DB;    ## Record that reason T failed was F3
198      $\Omega_{T+1}$ = (|EN|, |BL|, F, 2);
199 Clear BB and SIG[i] for each i = 1, 2, p; Remove $\Theta_T$ from DB;
200 Sign and Add to BB:         ## The Start of Transmission (SOT) broadcast
     a) $\Omega_{T+1}$, T+1)
     b) For each N ∈ EN, add the parcel (N, T+1)
     c) For each failed transmission T' since last node was eliminated, add parcel (T', Fi, T+1)
     ## Here, Fi is the reason trans. T' failed (F2, F3, or F4).
     d) For each N ∈ BL, add parcel (N, T', T+1), where T' indicates the trans. N was last added to BL
201 $\beta_t$ = 0;
202 End of Transmission Adjustments
203 if N ≠ S : Clear $\Theta_T$, BL, all parcels from SOT broadcast, info. of form ($\hat{N}$, 0, T) from BB;
204 for every outgoing edge E(N, B), B ∈ G, N ≠ R, B ≠ S:
205    if $H_{FP}$ ≠ ⊥:
206      OUT [$H_{FP}$] = ⊥; Fill Gap;    ## Remove any flagged packet $\tilde{p}$ from OUT,
                                  ## shifting down packets on top of $\tilde{p}$ if necessary -continued

```
207     sb = 0; FR, H_FP, p̃ = ⊥; H − 1;
208 for every incoming edge E(A, N), A ∈ G, A ≠ R:
209     H_GP = ⊥; sb = 0; RR = −1; Fill Gap;
210 if N = S then: Distribute Packets;
211 if N = R then: κ = 0; Clear I_R;       ## Set each entry of I_R to ⊥
212 Distribute Packets
213 κ = 0; H_OUT = 2n;                     ## Set height of each outgoing stack to 2n
214 Fill each outgoing stack with codeword packets;
    ## If T was successful, make new codeword p's, and fill out. stacks and COPY.
    ## If T failed or node was just eliminated, use codeword packets in COPY to fill out.
    ## stacks.
    IX.E    Re-Shuffle Rules
            The re-shuffle rules are the same as in Section VIII.E
```

What is claimed is:

1. A method for sending messages from a sender node to a receiver node via a network of intermediate nodes, the method comprising the sender node taking the steps of:
   authenticizing a plurality of packets derived from the messages to be sent to the receiver node;
   making a transmission attempt according to a protocol P, to send the authenticized packets into the network destined for the receiver node;
   testing for possible malicious behavior of intermediate nodes during the transmission attempt;
   upon identification of possible malicious behavior, requesting status reports from the intermediate nodes, wherein the status report from an intermediate node includes authenticized records concerning transfer of said packets to and/or from the intermediate node from and/or to its neighboring nodes;
   receiving at least some of the requested status reports;
   identifying at least one intermediate node as malicious based on the received status reports; and
   eliminating the identified malicious intermediate node from subsequent transmission attempts from the sender node to the receiver node.

2. The method of claim 1 wherein the protocol P requires the creation of said authenticized records as part of the packet transfer.

3. The method of claim 2 wherein the authenticized records concerning transfer of packets to and/or from the intermediate node (a) are authenticized by the neighboring node transferring the packet to and/or from the intermediate node, (b) are transferred to the intermediate node, and (c) are stored by the intermediate node.

4. The method of claim 3 wherein the step of identifying at least one intermediate node as malicious based on the received status reports comprises:
   for the intermediate nodes, analyzing the authenticized records concerning the transfer of packets to and/or from the intermediate node to identify whether the intermediate node is malicious.

5. The method of claim 3 wherein the step of identifying at least one intermediate node as malicious based on the received status reports comprises:
   for the intermediate nodes, analyzing the authenticized records concerning the transfer of packets to and/or from the intermediate node to identify whether the intermediate node has violated the protocol P.

6. The method of claim 1 wherein the step of testing for possible malicious behavior comprises testing whether the receiver node has received fewer than an expected minimum number of packets during the transmission attempt, the expected minimum number of packets determined by the protocol P.

7. The method of claim 6 wherein the expected minimum number of packets is based on (a) the number of packets inserted into the network during the transmission attempt, and (b) the change in the number of packets stored within the network during the transmission attempt.

8. The method of claim 6 wherein the test identifies possible malicious behavior if (a) the sender node has inserted more than a first expected minimum number of packets during the transmission attempt, and (b) the receiver node has received fewer than a second expected minimum number of packets during the transmission attempt; the first and second expected minimum numbers of packets determined by the protocol P.

9. The method of claim 6 wherein the step of identifying intermediate node(s) as malicious is based on the number of packets transferred into the intermediate node, the number of packets transferred out of the intermediate node, and the change in the number of packets stored in the intermediate node.

10. The method of claim 1 wherein the step of testing for possible malicious behavior comprises testing whether the sender node has inserted fewer than an expected minimum number of packets during the transmission attempt, the expected minimum number of packets determined by the protocol P.

11. The method of claim 10 wherein the expected minimum number of packets is based on (a) the number of packets received by the receiver node during the transmission attempt, and (b) the change in the number of packets stored within the network during the transmission attempt.

12. The method of claim 10 wherein the expected minimum number of packets is based on the minimum number of packets that the sender node should be able to insert into the network according to protocol P if there is no malicious behavior of intermediate nodes.

13. The method of claim 10 wherein the step of identifying intermediate node(s) as malicious is based on the number of packets transferred into the intermediate node, the number of packets transferred out of the intermediate node, and the change in the number of packets stored in the intermediate node.

14. The method of claim 1 wherein the step of testing for possible malicious behavior comprises testing whether the receiver node has received packets in a manner that violates the protocol P.

15. The method of claim 14 wherein the receiver node should receive only one copy of each packet according to protocol P, and the step of testing for possible malicious behavior comprises testing whether the receiver node has received at least two copies of the same packet.

16. The method of claim 14 wherein the protocol P requires that the packets are ordered, and the step of testing for possible malicious behavior comprises testing whether the receiver node is missing a packet from the ordered packets.

17. The method of claim 1 further comprising:
  placing an intermediate node on probation if the requested status reports are not received from the intermediate node; and
  temporarily eliminating probation nodes from transmission attempts from the sender node to the receiver node until the intermediate node is removed from probation.

18. The method of claim 1 wherein the protocol P is based on the Slide protocol.

19. The method of claim 1 wherein the step of testing for possible malicious behavior comprises:
  receiving an authenticized report from the receiver node concerning the transmission attempt; and
  testing for possible malicious behavior based on the report received from the receiver node.

20. The method of claim 19 wherein the authenticized report is received from the receiver node via the network of intermediate nodes.

21. The method of claim 1 wherein protocol P requires synchronous transfer between nodes.

22. A non-transitory tangible computer readable medium containing instructions that, when executed by a sender node, cause the sender node to implement a method for sending messages from the sender node to a receiver node via a network of intermediate nodes, the method comprising the steps of:
  authenticizing a plurality of packets derived from the messages to be sent to the receiver node;
  making a transmission attempt according to a protocol P, to send the authenticized packets into the network destined for the receiver node;
  testing for possible malicious behavior of intermediate nodes during the transmission attempt;
  upon identification of possible malicious behavior, requesting status reports from the intermediate nodes, wherein the status report from an intermediate node includes authenticized records concerning transfer of said packets to and/or from the intermediate node from and/or to its neighboring nodes;
  receiving at least some of the requested status reports;
  identifying at least one intermediate node as malicious based on the received status reports; and
  eliminating the identified malicious intermediate node from subsequent transmission attempts from the sender node to the receiver node.

23. A method for sending messages from a sender node to a receiver node via a network of intermediate nodes, the method comprising the sender node taking the steps of:
  authenticizing a plurality of packets derived from the messages to be sent to the receiver node;
  making a transmission attempt according to a protocol P, to send the authenticized packets into the network destined for the receiver node;
  testing for possible malicious behavior of intermediate nodes during the transmission attempt;
  upon identification of possible malicious behavior, requesting status reports from the intermediate nodes, wherein the status report from an intermediate node includes authenticized records concerning transfer of said packets to and/or from the intermediate node from and/or to its neighboring nodes;
  placing an intermediate node on probation if the requested status reports are not received from the intermediate node; and
  temporarily eliminating probation nodes from transmission attempts from the sender node to the receiver node until the intermediate node is removed from probation.

24. A method for sending messages from a sender node to a receiver node via a network of approximately n intermediate nodes, the method comprising the sender node taking the steps of:
  converting the messages into codewords using an error-correcting code with error rate $\lambda$;
  converting the codewords into approximately D codeword packets per codeword, where $D = 6\, n^3/\lambda$;
  authenticizing the D codeword packets for a single codeword;
  making a transmission attempt according to a protocol P to send the D authenticized codeword packets into the network destined for the receiver node; the protocol P being a synchronous Slide-based protocol using rounds of packet transfer; the transmission attempt lasting approximately 6D rounds; the protocol P requiring the creation of authenticized records as part of a packet transfer from a node A to a node B, the authenticized records including (a) a record authenticized by node A, transferred to node B and stored by node B, and (b) a record authenticized by node B, transferred to node A and stored by node A;
  at the end of the transmission attempt determining which of the following cases exists:
    case F1: the receiver node received sufficient codeword packets to decode the codeword;
    case F2: the sender nodes inserted fewer than D codeword packets into the network;
    case F3: the sender node inserted at least D codeword packets into the network, the receiver node did not receive a sufficient number of codeword packets to decode the codeword but did not receive any duplicate copies of a codeword packet; or
    case F4: none of the above;
  for cases F2, F3 and F4:
    requesting status reports from the intermediate nodes, said status reports including the authenticized records;
    receiving at least some of the requested status reports;
    placing an intermediate node on probation if the requested status reports are not received from the intermediate node;
    temporarily eliminating probation nodes from transmission attempts from the sender node to the receiver node until the intermediate node is removed from probation;
    possibly identifying at least one intermediate node as malicious based on the received status reports; and
    eliminating the identified malicious intermediate node from subsequent transmission attempts from the sender node to the receiver node.

* * * * *